United States Patent
Mordukhovich

(10) Patent No.: US 10,221,921 B2
(45) Date of Patent: Mar. 5, 2019

(54) TORQUE SPLIT DUAL-CLUTCH TRANSMISSION

(71) Applicant: AVL Powertrain Engineering, Inc., Plymouth, MI (US)

(72) Inventor: Gregory Mordukhovich, Bloomfield Hills, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 483 days.

(21) Appl. No.: 14/941,484

(22) Filed: Nov. 13, 2015

(65) Prior Publication Data

US 2016/0146320 A1    May 26, 2016

Related U.S. Application Data

(60) Provisional application No. 62/082,688, filed on Nov. 21, 2014.

(51) Int. Cl.
  *F16H 3/08*    (2006.01)
  *F16H 3/097*   (2006.01)
  (Continued)

(52) U.S. Cl.
  CPC .......... *F16H 3/097* (2013.01); *F16H 37/043* (2013.01); *F16H 37/046* (2013.01); *F16H 3/006* (2013.01); *F16H 2003/0931* (2013.01)

(58) Field of Classification Search
  CPC .......... F16H 37/021; F16H 2003/0931; F16H 2003/007; F16H 2003/008
  (Continued)

(56) References Cited

U.S. PATENT DOCUMENTS

| 2,972,899 A | 2/1961 | Wiggermann |
| 4,513,631 A | 4/1985 | Koivunen |

(Continued)

FOREIGN PATENT DOCUMENTS

GB    2112883 A    7/1983

OTHER PUBLICATIONS

Hellenbroich, Gereon et al.; "Innovative xDCT Family of FEV—Extremely Compact 7 and 10 Speed DCTs;" SAE International Symposium on International Automotive Technology 2013, SAE Technical Paper 2013-26-0120, Jan. 9-12, 2013, SIAT, India; pp. 1-5.

(Continued)

*Primary Examiner* — Ha Dinh Ho
(74) *Attorney, Agent, or Firm* — Harness, Dickey & Pierce, P.L.C.

(57) ABSTRACT

A torque split dual-clutch transmission assembly is disclosed that splits the torque generated by an engine between at least two sets of transfer gears that are selectively coupled to first and second layshafts or intermediate shafts. A first input hub is connected to the first layshaft by a first clutch and a second input hub is connected to the second layshaft by a second clutch. A first gearset is carried on the first layshaft and a second gearset is carried on the second layshaft. Each set of transfer gears receives torque from either the transmission input shaft or the first and second layshafts in response to contemporaneous engagement of the first clutch and the second clutch, which can be used during vehicle launch to split the torque applied to the first and second clutches.

39 Claims, 7 Drawing Sheets

(51) Int. Cl.
*F16H 37/04* (2006.01)
*F16H 3/00* (2006.01)
*F16H 3/093* (2006.01)

(58) Field of Classification Search
USPC .................................. 74/330, 331, 333, 340
See application file for complete search history.

(56) References Cited

U.S. PATENT DOCUMENTS

| | | | |
|---|---|---|---|
| 4,640,145 A * | 2/1987 | Vandervoort | F16H 3/095 74/325 |
| 4,658,663 A | 4/1987 | Hiraiwa | |
| 5,150,628 A | 9/1992 | Alfredsson | |
| 5,172,602 A | 12/1992 | Jurgens et al. | |
| 5,347,879 A | 9/1994 | Ordo | |
| 6,427,549 B1 * | 8/2002 | Bowen | B60K 6/48 74/331 |
| 6,634,247 B2 | 10/2003 | Pels et al. | |
| 6,755,089 B2 * | 6/2004 | Hirt | F16H 3/006 74/329 |
| 6,958,028 B2 | 10/2005 | Janson et al. | |
| 7,587,957 B2 | 9/2009 | Jackson | |
| 7,913,581 B2 | 3/2011 | Jackson | |
| 8,051,732 B2 | 11/2011 | Gitt | |
| 9,897,165 B2 * | 2/2018 | Mordukhovich | F16H 3/006 |
| 2004/0025612 A1 | 2/2004 | Ahnert et al. | |
| 2006/0142104 A1 | 6/2006 | Sailer | |
| 2014/0150584 A1 | 6/2014 | Terashima | |
| 2016/0146321 A1 | 5/2016 | Mordukhovich et al. | |

OTHER PUBLICATIONS

Hellenbroich, Gereon et al.; "FEV's new parallel hybrid transmission with single dry clutch and electric torque support;" VDI-Berichte 2017, Internationaler VDI-Kongress, Getriebe in Fahrzeugen 2009, Jun. 30, and Jul. 1, 2009; http://www.fev.com/fileadmin/usuer_upload/Media/TechnicalPublications/Transmission/V_4_FEV's_new_parallel_hybrid_transmission_with_single_dry_clutch_and_electric_torque_support.pdf; 11 pages.

* cited by examiner

TORQUE SPLIT DUAL-CLUTCH TRANSMISSION

CROSS-REFERENCE TO RELATED APPLICATIONS

This application claims the benefit of U.S. Provisional Application No. 62/082,688, filed on Nov. 21, 2014. This application is related to U.S. application Ser. No. 14/941,488, filed on Nov. 13, 2015. The entire disclosures of the applications referenced above are incorporated herein by reference.

FIELD

The present disclosure generally relates to the field of dual-clutch transmissions (DCT). More specifically, a torque split dual-clutch transmission assembly is disclosed that splits the torque generated by an engine of a vehicle into multiple torque flow paths.

BACKGROUND

This section provides background information related to the present disclosure which is not necessarily prior art.

Conventional dual-clutch transmissions (DCT) combine two manual transmissions into a single transmission assembly. Accordingly, dual-clutch transmissions provide a design alternative to conventional manual and automatic transmissions and can offer increased efficiency when properly configured for a particular vehicle. With increasing fuel costs, vehicle fuel economy has become an important design consideration in recent years contributing to a rise in the number of dual-clutch transmissions being installed in vehicles, particularly in the automotive market.

Dual-clutch transmissions typically include two layshafts, each supporting a plurality of gears. Each layshaft may also have a clutch interconnecting the layshaft with a hub and each clutch connects and disconnects each respective layshaft from the engine. One of the layshafts may include only odd numbered gears while the other layshaft may include only even numbered gears so that clutch-to-clutch power-on shifts can be accomplished in a similar manner to the shifting of a planetary automatic transmission. Accordingly, one of the layshafts may carry a first gear while the other layshaft carries a second gear and so on. The number of forward gear ratios provided thus equals a sum of the number of gears disposed along the two layshafts. Additional gear ratios thus require the addition of odd and even numbered gears to the layshafts, which contributes to a larger, heavier, costlier, and less efficient dual-clutch transmission.

During vehicle launch, conventional dual-clutch transmissions engage the first gear and the clutch that is connected to the layshaft supporting the odd numbered gears. Accordingly, all of the torque from the engine is directed through this one clutch. To reduce the noise, vibration, and harshness of the vehicle launch, some slip of this clutch is permitted until a minimum required vehicle speed is achieved and clutch lock-up torque disturbance is within pre-designated limits. This clutch slip, particularly for extended durations of time, requires an effective cooling strategy for the clutch. Where the clutch is a wet clutch, cooling is achieved by high volume fluid flow through the clutch, which may reach up to 20 liters per minute. Such coolant flow requirements lead to an increase in pump size and/or number, which increases parasitic losses and thereby decreases the efficiency of the dual-clutch transmission. Accordingly, dry clutches are typically more efficient since pump related losses can be reduced or eliminated. However, such dry clutches rely on less efficient air-cooling and repeated launches can lead to overheating of the clutch. Limiting slip time or alternating first gear launches with second gear launches (thus utilizing the clutch for the even numbered gears while the clutch for the odd numbered gears cools) has been used as a strategy to avoid structural damage to the clutch and/or transmission, but there are several drawbacks associated with these strategies. Mainly, torque jerks, slower acceleration, and increased noise, vibration, and harshness occur.

SUMMARY

This section provides a general summary of the disclosure, and is not a comprehensive disclosure of its full scope or all of its features.

In accordance with one aspect of the subject disclosure, a torque split dual-clutch transmission assembly is provided that splits the torque generated by the engine of a vehicle between at least two sets of transfer gears. The two sets of transfer gears are selectively coupled to and are carried on first and second input hubs, which are selectively coupled to first and second layshafts by first and second clutches. The torque split dual-clutch transmission assembly generally includes a transmission input shaft that receives torque from the engine of the vehicle and a transmission output shaft that supplies torque to drivetrain components of the vehicle. The first and second input hubs are disposed adjacent the first and second layshafts. The first clutch is disposed between and interconnects the first input hub and the first layshaft and selectively couples rotation of the first input hub with the first layshaft. The second clutch is disposed between and interconnects the second input hub and the second layshaft and selectively couples rotation of the second input hub with the second layshaft. A first gearset is rotatably coupled to and carried on the first layshaft that transfers torque between the first layshaft and the transmission output shaft. A second gearset is rotatably coupled to and carried on the second layshaft that transfers torque between the second layshaft and the transmission output shaft. At least two sets of transfer gears are selectively coupled to and carried on the first and second input hubs respectively. Each set of transfer gears receives torque from the transmission input shaft in response to contemporaneous engagement of the first clutch and the second clutch. As a result, the torque produced by the engine is split between the first and second clutches. Advantageously, the first and second clutches can be engaged contemporaneously during launch of the vehicle to split the torque produced by the engine between the first and second clutches, which in turn reduces heat generation in the first clutch and in the second clutch.

In accordance with another aspect of the subject disclosure, a torque split dual-clutch transmission assembly is provided that splits the torque generated by the engine of a vehicle between at least two sets of transfer gears that are carried on first and second intermediate shafts. Again, the torque split dual-clutch transmission assembly generally includes a transmission input shaft, a transmission output shaft, a first layshaft, a second layshaft, a first input hub, and a second input hub. A first clutch is disposed between and interconnects the first input hub and the first layshaft and a second clutch is disposed between and interconnects the second input hub and the second layshaft. A first gearset is rotatably coupled to and carried on the first layshaft and a second gearset is rotatably coupled to and carried on the second layshaft.

The first intermediate shaft of the torque split dual-clutch transmission assembly is positioned adjacent the first layshaft and the second intermediate shaft is positioned adjacent the second layshaft. A third gearset is rotatably coupled to and carried on the first intermediate shaft and a fourth gearset is rotatably coupled to and carried on the second intermediate shaft. Also, the third gearset is arranged in meshing engagement with the first gearset and the fourth gearset is arranged in meshing engagement with the second gearset. At least two sets of transfer gears are selectively coupled to and carried on the first and second intermediate shafts respectively. Each set of transfer gears receives torque from the first and second intermediate shafts in response to contemporaneous engagement of the first clutch and the second clutch. Thus, the torque that the engine applies to transmission input shaft is split between the first and second clutches. Advantageously, the first and second clutches can be engaged contemporaneously during launch of the vehicle to split the torque produced by the engine between the first and second clutches, which in turn reduces heat generation in the first clutch and in the second clutch.

In accordance with another aspect of the subject disclosure, the first and second input hubs each have at least one transfer gear that is rotatably coupled to and carried on the first and second input hubs, respectively. The transfer gears have different diameters and are arranged in meshing engagement with at least one transmission input gear such that each transfer gear receives torque from the transmission input shaft. The torque that is applied to the transfer gears is split between the first and second clutches in response to engagement of the second clutch while the first clutch is also engaged. As a result, the first and second input hubs may include only one transfer gear each and the transfer gear that is carried on the first input hub may have a different diameter than the transfer gear that is carried on the second input hub.

In accordance with yet another aspect of the subject disclosure, a torque split dual-clutch transmission assembly is provided that receives the torque generated by the engine through two co-axially arranged input members and divides the engine generated torque between first and second clutches. The two input members include a first input member that is rotatably coupled to at least one transmission input shaft and a second input member that is disposed co-axially within the first input member. The torque split dual-clutch transmission assembly also includes a first shaft that is hollow and aligned with the first input member and a second shaft that is disposed co-axially within the first shaft. The first clutch is disposed between and interconnects the first input member and the first shaft and the second clutch is disposed between and interconnects the second input member and the second shaft. When the first clutch is engaged during the operation of the torque split dual-clutch transmission assembly, the first clutch rotatably couples the first input member and the first shaft to transfer torque from the first input member to the first shaft. When the second clutch is engaged during operation of the torque split dual-clutch transmission assembly, the second clutch rotatably couples the second input member with the second shaft to transfer torque from the second input member to the second shaft. The torque split dual-clutch transmission assembly further includes a third shaft that is hollow and that extends co-axially about the second shaft at a location that is axially spaced from the first shaft. A planetary gearset is disposed between and interconnects the first shaft and the third shaft.

A first gearset is rotatably coupled to and carried on the third shaft and a second gearset is rotatably coupled to and carried on the second shaft. An output member extends co-axially about the first gearset and the second gearset. The output member is rotatably coupled to a transmission output shaft and an output gearset is rotatably coupled to and carried on the output member. The output gearset is arranged in meshing engagement with the first gearset and the second gearset. The first and second gearsets receive torque from the second third and second shafts in response to contemporaneous engagement of the first and second clutches. Thus, the torque that the engine applies to transmission input shaft is split between the first and second clutches. Advantageously, the first and second clutches can be engaged contemporaneously during launch of the vehicle to split the torque produced by the engine between the first and second clutches, which in turn reduces heat generation in the first clutch and in the second clutch.

Since the disclosed torque split dual-clutch transmission assemblies reduce heat generation in the first and second clutches, a more efficient, more durable, and better performing transmission is realized. Where the first and second clutches are wet clutches, the coolant flow requirements of the clutches are reduced leading to reduced pumping losses and increased efficiency. Where the first and second clutches are dry clutches, less heat generation results in fewer clutch failures, the possibility of longer slip times, and first gear launches can be utilized exclusively (as opposed to alternating between first and second gear launches) for improved acceleration and reduced noise, vibration, and harshness. Furthermore, clutch size and clutch cooling provisions can be reduced. An additional advantage is that the number of gear ratios of the transmission can also be increased without increasing the number of gears supported on the layshafts. Ultimately, this results in a smaller, lighter, cheaper, and more efficient dual-clutch transmission assembly.

In accordance with another aspect of the subject disclosure, a method of controlling the dual-clutch transmission assemblies described above is disclosed. Advantageously, the method splits the torque produced by the engine between the first and second clutches during vehicle launch to prevent the first and second clutches from overheating. The method comprising the steps of: applying torque to the transmission input shaft of the dual-clutch transmission assembly to rotate the transmission input shaft, transferring the torque applied to the transmission input shaft to the first input hub of the dual-clutch transmission assembly through a first torque flow path in order to rotate the first input hub at a first rotational speed, and transferring the torque applied to the transmission input shaft to the second input hub of the dual-clutch transmission assembly through a second torque flow path in order to rotate the second input hub at a second rotational speed. The method further comprises the step of engaging the first clutch, which is disposed between the first input hub and the first layshaft of the dual-clutch transmission assembly, in order to transfer torque from the first input hub to the first layshaft. The first layshaft therefore rotates at the first rotational speed in response to the engagement of the first clutch. Similarly, the method includes the step of engaging the second clutch, which is disposed between the second input hub and the second layshaft of the dual-clutch transmission assembly, while the first clutch is also engaged, in order to transfer torque from the second input hub to the second layshaft. The second layshaft therefore rotates at the second rotational speed in response to the engagement of the second clutch. The method also includes the step of transferring the torque applied to the first and second layshafts to the transmission output shaft of the dual-clutch transmission assembly through two gears that are rotatably coupled to and carried on the first and second layshafts respectively.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
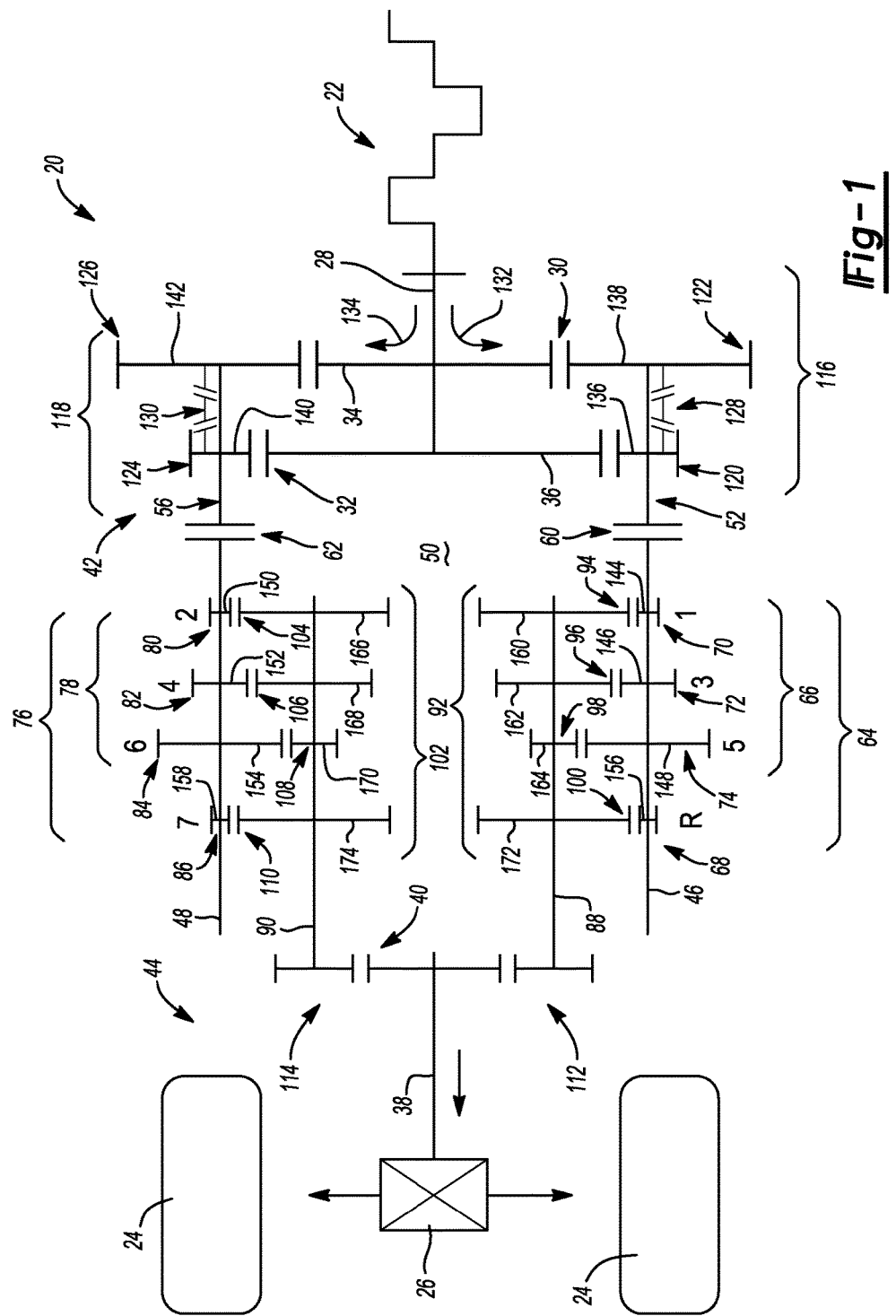
FIG. 1 is a schematic view of an exemplary torque split dual-clutch transmission assembly constructed in accordance with the subject disclosure where two sets of transfer gears are carried on first and second input hubs.

Referring to the Figures, wherein like numerals indicate corresponding parts throughout the several views, a torque split dual-clutch transmission assembly 20 is disclosed. It should be appreciated that in operation, the torque split dual-clutch transmission assembly 20 splits the torque generated by an engine 22 of a vehicle and applies the torque to the wheels 24 of a vehicle through one or more drivetrain components 26.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, the torque split dual-clutch transmission assembly 20 includes a transmission input shaft 28 that receives torque from the engine 22 of the vehicle. A first transmission input gear 30 and a second transmission input gear 32 are rotatably coupled to and carried on the transmission input shaft 28. By way of example and without limitation, the first and second transmission input gears 30, 32 may be fixed to the transmission input shaft 28 by a splined, bolted, or welded connection or may be integral with the transmission input shaft 28. The second transmission input gear 32 is disposed adjacent the first transmission input gear 30 and the first transmission input gear 30 is positioned between the second transmission input gear 32 and the engine 22. The first and second transmission input gears 30, 32 have different diameters where the first transmission input gear 30 has a first transmission input gear diameter 34 and the second transmission input gear 32 has a second transmission input gear diameter 36 that is larger than the first transmission input gear diameter 34. The torque split dual-clutch transmission assembly 20 also includes a transmission output shaft 38 that supplies torque to the wheels 24 through the drivetrain components 26 of the vehicle. By way of example and without limitation, the drivetrain components 26 could be part of a final drive assembly. A transmission output gear 40 is rotatably coupled to and carried on the transmission output shaft 38. By way of example and without limitation, the transmission output gear 40 may be fixed to the transmission output shaft 38 by a splined, bolted, or welded connection or may be integral with the transmission output shaft 38. Accordingly, the torque split dual-clutch transmission assembly 20 receives torque through the transmission input shaft 28, which may generally be positioned at one end 42 of the torque split dual-clutch transmission assembly 20 and outputs torque through the transmission output shaft 38, which may generally be positioned at an opposite end 44 of the torque split dual-clutch transmission assembly 20. The torque split dual-clutch transmission assembly 20 may thus be installed in a vehicle between the engine 22 of the vehicle and the various drivetrain components 26, including without limitation, the final drive assembly. It should be appreciated that such drivetrain components 26 ultimately couple the transmission output shaft 38 to one or more wheels 24 of the vehicle such that the wheels 24 of the vehicle are rotatably driven by rotation of the transmission output shaft 38.

The torque-split dual-clutch transmission assembly 20 further includes a first layshaft 46 and a second layshaft 48. As shown in FIG. 1, the first layshaft 46 extends parallel to and is transversely spaced from the transmission input shaft 28. The second layshaft 48 extends parallel to and is transversely spaced from the transmission input shaft 28 and the first layshaft 46. Thus, the first and second layshafts 46, 48 are parallel with one another. However, it should be appreciated that other arrangements are possible and are within the scope of the subject disclosure, including without limitation, the arrangements illustrated in FIGS. 6 and 7, where the first and second layshafts 46, 48 are hollow and are co-axially aligned in an overlapping relationship. The transmission input shaft 28 and the transmission output shaft 38 may generally be aligned with one another and are spaced from one another by a longitudinally extending gap 50. The first and second layshafts 46, 48 may generally be transversely spaced from one another by this longitudinally extending gap 50 and may extend along the length of the longitudinally extending gap 50.

The first layshaft 46 is generally aligned with a first input hub 52 that is disposed adjacent the transmission input shaft 28. Similarly, the second layshaft 48 is aligned with a second input hub 56 that is also disposed adjacent the transmission input shaft 28. A first clutch 60 is disposed between and interconnects the first input hub 52 and the first layshaft 46. A second clutch 62 is disposed between and interconnects the second input hub 56 and the second layshaft 48. During operation of the torque split dual-clutch transmission assembly 20, the first clutch 60 selectively couples rotation of the first input hub 52 with rotation of the first layshaft 46 and the second clutch 62 selectively couples rotation of the second input hub 56 with rotation of the second layshaft 48. It should further be appreciated that the first and second clutches 60, 62 may be, without limitation, wet clutches or dry clutches and may be constructed of various known components including, without limitation, clutch plates, actuators, and friction surfaces.

A first gearset 64 including a plurality of odd numbered gears 66 and a reverse gear 68 is rotatably coupled to and carried on the first layshaft 46. Although any number of odd numbered gears 66 and reverse gears 68 may be utilized without departing from the scope of the present disclosure, the plurality of odd numbered gears 66 illustrated in FIG. 1 includes a first gear 70, a third gear 72, and a fifth gear 74. A second gearset 76 including a plurality of even numbered gears 78 is rotatably coupled to and carried on the second layshaft 48. Again, while any number of even numbered gears 78 may be utilized, the plurality of even numbered gears 78 illustrated in FIG. 1 includes a second gear 80, a fourth gear 82, and a sixth gear 84. The second gearset 76 also includes a seventh gear 86 that is rotatably coupled to and carried on the second layshaft 48.

Of course it should be appreciated that the arrangement of gears described and illustrated in this application is merely exemplary and that other arrangements are envisioned. By way of example and without limitation, placement of the reverse gear 68 and the seventh gear 86 may be reversed where the reverse gear 68 is rotatably coupled to and carried on the second layshaft 48 and the seventh gear 86 may be rotatably coupled to and carried on the first layshaft 46. Alternatively, both the reverse gear 68 and the seventh gear 86 may be rotatably coupled to and carried on the same layshaft. Further it should be appreciated that the term "rotatably coupled to" as used herein means that the gears of the first gearset 64 and the gears of the second gearset 76, when engaged, rotate with the first layshaft 46 and the second layshaft 48, respectively. Engagement of the gears of the first gearset 64 with the first layshaft 46 and engagement of the gears of the second gearset 76 with the second layshaft 48 can be accomplished by any of the couplings known in the art, including without limitation, dog clutches or mechanical diodes (not shown). Alternatively, the gears of the first gearset 64 and the second gearset 76 may always be engaged where the gears of the first gearset 64 and the second gearset 76 are fixed to the first and second layshafts 46, 48 respectively. By way of example and without limitation, the gears of the first and second gearsets 64, 76 may be fixed to the first and second layshafts 46, 48 respectively by a splined, bolted, or welded connection or may be integral with the first and second layshafts 46, 48. The term "carried on" as used herein means that the gears of the first gearset 64 and the gears of the second gearset 76 are disposed on and are supported by the first layshaft 46 and the second layshaft 48, respectively.

Still referring to FIG. 1, the torque split dual-clutch transmission assembly 20 includes a first intermediate shaft 88 and a second intermediate shaft 90. The first intermediate shaft 88 extends parallel to the first layshaft 46 and is transversely spaced from the first layshaft 46. More specifically, the first intermediate shaft 88 is positioned adjacent the first layshaft 46 and may be positioned between the first layshaft 46 and the second layshaft 48. The second intermediate shaft 90 extends parallel to the second layshaft 48 and is transversely spaced from the second layshaft 48. The second intermediate shaft 90 is positioned adjacent the second layshaft 48 and may also be positioned between the first layshaft 46 and the second layshaft 48. Therefore, the first and second layshafts 46, 48 may be arranged parallel to one another and the first and second intermediate shafts 88, 90 may be arrangement parallel to one another and parallel to the first and second layshafts 46, 48. Further, the first and second intermediate shafts 88, 90 may be positioned between the first and second layshafts 46, 48. Accordingly, the first and second intermediate shafts 88, 90 may or may not be positioned in the same plane as the first and second layshafts 46, 48. Where the first and second intermediate shafts 88, 90 are positioned in the same plane as the first and second layshafts 46, 48, the torque split dual-clutch transmission assembly 20 may be constructed in a compact manner such that packaging advantages may be realized.

A third gearset 92 is rotatably coupled to and carried on the first intermediate shaft 88. The third gearset 92 is also arranged in meshing engagement with the plurality of odd numbered gears 66 and the reverse gear 68 of the first gearset 64. Accordingly, the gears of the third gearset 92 are aligned with corresponding counter-part gears of the first gearset 64 such that the first gearset 64 transfers rotational energy and torque from the first layshaft 46 to the third gearset 92 and thus the first intermediate shaft 88 during operation of the of the torque split dual-clutch transmission assembly 20. By way of example and without limitation, the third gearset 92 may more specifically include: a first output gear 94 arranged in meshing engagement with the first gear 70 of the first gearset 64, a third output gear 96 arranged in meshing engagement with the third gear 72 of the first gearset 64, a fifth output gear 98 arranged in meshing engagement with the fifth gear 74 of the first gearset 64, and a reverse output gear 100 arranged in meshing engagement with the reverse gear 68 of the first gearset 64.

Similarly, a fourth gearset 102 is rotatably coupled to and carried on the second intermediate shaft 90. The fourth gearset 102 is arranged in meshing engagement with the plurality of even numbered gears 78 and the seventh gear 86 of the second gearset 76. Accordingly, the gears of the fourth gearset 102 are aligned with corresponding counter-part gears of the second gearset 76 such that the second gearset 76 transfers rotational energy and torque from the second layshaft 48 to the fourth gearset 102 and thus the second intermediate shaft 90 during operation of the of the torque split dual-clutch transmission assembly 20. By way of example and without limitation, the fourth gearset 102 may more specifically include: a second output gear 104 arranged in meshing engagement with the second gear 80 of the second gearset 76, a fourth output gear 106 arranged in meshing engagement with the fourth gear 82 of the second gearset 76, a sixth output gear 108 arranged in meshing engagement with the sixth gear 84 of the second gearset 76, and a seventh output gear 110 arranged in meshing engagement with the seventh gear 86 of the second gearset 76. Further it should be appreciated that the term "rotatably coupled to" as used herein means that the gears of the first gearset 64 and the gears of the second gearset 76, when engaged, rotate with the first layshaft 46 and the second layshaft 48, respectively. Engagement of the gears of the first gearset 64 with the first layshaft 46 and engagement of the gears of the second gearset 76 with the second layshaft 48 can be accomplished by any of the couplings known in the art, including without limitation, dog clutches or mechanical diodes (not shown). Alternatively, the gears of the first gearset 64 and the second gearset 76 may always be engaged where the gears of the first gearset 64 and the second gearset 76 are fixed to the first and second layshafts 46, 48 respectively. By way of example and without limitation, the gears of the first and second gearsets 64, 76 may be fixed to the first and second layshafts 46, 48 respectively by a splined, bolted, or welded connection or may be integral with the first and second layshafts 46, 48. The term "carried on" as used herein means that the gears of the first gearset 64 and the gears of the second gearset 76 are disposed on and are supported by the first layshaft 46 and the second layshaft 48, respectively.

A first intermediate shaft output gear 112 is rotatably coupled to and carried on the first intermediate shaft 88. The first intermediate shaft output gear 112 is arranged in meshing engagement with the transmission output gear 40 such that the first intermediate shaft output gear 112 transfers rotational energy and torque from the first intermediate shaft 88 to the transmission output gear 40 and thus the transmission output shaft 38 during operation of the of the torque split dual-clutch transmission assembly 20. A second intermediate shaft output gear 114 is rotatably coupled to and carried on the second intermediate shaft 90. The second intermediate shaft output gear 114 is arranged in meshing engagement with the transmission output gear 40 opposite the first intermediate shaft output gear 112. Accordingly, the second intermediate shaft output gear 114 transfers rotational energy and torque from the second intermediate shaft 90 to the transmission output gear 40 and thus the transmission output shaft 38 during operation of the of the torque split dual-clutch transmission assembly 20. In this way, torque maybe applied to the transmission output gear 40 and thus the transmission output shaft 38 simultaneously by both the first intermediate shaft 88 and the second intermediate shaft 90 through the first intermediate shaft output gear 112 and the second intermediate shaft output gear 114, respectively. By way of example and without limitation, the first intermediate shaft output gear 112 may be fixed to the first intermediate shaft 88 by a splined, bolted, or welded connection or may be integral with the first intermediate shaft 88 and the second intermediate shaft output gear 114 may be fixed to the second intermediate shaft 90 by a splined, bolted, or welded connection or may be integral with the second intermediate shaft 90.

The torque split dual-clutch transmission assembly 20 further includes at least two sets of transfer gears 116, 118 that are selectively coupled to and carried on the first and second layshafts 46, 48, respectively. Each of the at least two sets of transfer gears 116, 118 receives torque from the transmission input shaft 28 in response to contemporaneous engagement of the first clutch 60 and the second clutch 62 during launch of the vehicle to evenly split the torque applied to the first and second clutches 60, 62. It should be appreciated that the term "contemporaneous", as used herein, means that the first and second clutches 60, 62 are both in an engaged state at a single moment in time; however, this term does not require the first and second clutches 60, 62 to be switched to the engaged state or switched back to a disengaged state at the same time as sequential control of the first and second clutches 60, 62 is also envisioned and within the scope of the subject disclosure.

Advantageously, this reduces the amount of heat generated in the first clutch 60 and/or in the second clutch 62 during operation of the torque split dual-clutch transmission assembly 20, especially during repeated vehicle launches where heat generation in the first clutch 60 and/or second clutch 62 can be problematic and detrimental to the structural integrity and performance of the first clutch 60 and/or second clutch 62. As shown in FIG. 1, the at least two sets of transfer gears 116, 118 may more particularly include a first set of transfer gears 116 and a second set of transfer gears 118. More particularly, the first set of transfer gears 116 may include a first transfer gear 120 and a second transfer gear 122 and the second set of transfer gears 118 may include a third transfer gear 124 and a fourth transfer gear 126.

With regard to the first set of transfer gears 116, the first transfer gear 120 is selectively coupled to and carried on the first input hub 52 and is disposed adjacent the first clutch 60. The first transfer gear 120 is arranged in meshing engagement with the second transmission input gear 32 such that the second transmission input gear 32 transfers rotational energy and torque from the transmission input shaft 28 to the first transfer gear 120 and thus the first input hub 52 and the first layshaft 46 when the first transfer gear 120 and the first clutch 60 are both engaged during operation of the of the torque split dual-clutch transmission assembly 20. The second transfer gear 122 is selectively coupled to and carried on the first input hub 52 and is disposed adjacent the first transfer gear 120. Accordingly, the first transfer gear 120 is positioned between the first clutch 60 and the second transfer gear 122. The second transfer gear 122 is arranged in meshing engagement with the first transmission input gear 30 such that the first transmission input gear 30 transfers rotational energy and torque from the transmission input shaft 28 to the second transfer gear 122 and thus the first input hub 52 and the first layshaft 46 when the second transfer gear 122 and the first clutch 60 are both engaged during operation of the of the torque split dual-clutch transmission assembly 20.

With regard to the second set of transfer gears 118, the third transfer gear 124 is selectively coupled to and carried on the second input hub 56 and is disposed adjacent the second clutch 62. The third transfer gear 124 is arranged in meshing engagement with the second transmission input gear 32 opposite the first transfer gear 120. Accordingly, the second transmission input gear 32 transfers rotational energy and torque from the transmission input shaft 28 to the third transfer gear 124 and thus the second input hub 56 and the second layshaft 48 when the third transfer gear 124 and the second clutch 62 are both engaged during operation of the of the torque split dual-clutch transmission assembly 20. The fourth transfer gear 126 is selectively coupled to and carried on the second input hub 56 and is disposed adjacent the third transfer gear 124. Accordingly, the third transfer gear 124 is positioned between the second clutch 62 and the fourth transfer gear 126. The fourth transfer gear 126 is arranged in meshing engagement with the first transmission input gear 30 opposite the second transfer gear 122. Therefore, the first transmission input gear 30 transfers rotational energy and torque from the transmission input shaft 28 to the fourth transfer gear 126 and thus the second input hub 56 and the second layshaft 48 when the fourth transfer gear 126 and the second clutch 62 are both engaged during operation of the of the torque split dual-clutch transmission assembly 20

Selectable engagement of the first transfer gear 120, the second transfer gear 122, the third transfer gear 124, and the fourth transfer gear 126 is provided by a first dog clutch 128 and a second dog clutch 130. The first transfer gear 120 and the second transfer gear 122 may be disposed in a free-running configuration on the first input hub 52 and the third transfer gear 124 and the fourth transfer gear 126 may be disposed in a free-running configuration on the second input hub 56. By way of example and without limitation, bearing assemblies may be provided between the first input hub 52 and the first and second transfer gears 120, 122 and the second input hub 56 and the third and fourth transfer gears 124, 126. The first dog clutch 128 may be disposed adjacent the first input hub 52 between the first transfer gear 120 and the second transfer gear 122 that selectively locks rotation of at least one of the first transfer gear 120 and the second transfer gear 122 with rotation of the first input hub 52. Similarly, the second dog clutch 130 may be disposed adjacent the second input hub 56 between the third transfer gear 124 and the fourth transfer gear 126 that selectively locks rotation of at least one of the third transfer gear 124 and the fourth transfer gear 126 with rotation of the second input hub 56. During vehicle launch, the first and second clutches 60, 62 and the first and second dog clutches 128, 130 are engaged such that the torque applied to the transmission input shaft 28 is split into two torque flow paths 132, 134 including a first torque flow path 132 and a second torque flow path 134 that pass through the first and second layshafts 46, 48 respectively. The two torque flow paths 132, 134 pass from the first and second layshafts 46, 48 to the first and second intermediate shafts 88, 90 and are then recombined at the transmission output gear 40. In this way, each of the first and second clutches 60, 62 experience only a portion of the torque that is applied to the transmission input shaft 28, therefore reducing heat generation in the first clutch 60 and/or the second clutch 62.

The first and second transfer gears 120, 122 of the first set of transfer gears 116 may have different diameters and the third and fourth transfer gears 124, 126 of the second set of transfer gears 118 may have different diameters. For example, the first transfer gear 120 may have a first transfer gear diameter 136 and the second transfer gear 122 may have a second transfer gear diameter 138 that is larger than the first transfer gear diameter 136. The third transfer gear 124 may have a third transfer gear diameter 140 and the fourth transfer gear 126 may have a fourth transfer gear diameter 142 that is larger than the second transfer gear diameter 138. In this way, the difference in diameter between the first and second transfer gears 120, 122 and between the third and fourth transfer gears 124, 126 may correspond to the difference in diameter between the first transmission input gear 30 and the second transmission input gear 32. Preferably, the first set of transfer gears 116 and the second set of transfer gears 118 may also have equal gear ratios. For example, the third transfer gear diameter 140 may be equal to the first transfer gear diameter 136 and the fourth transfer gear diameter 142 may be equal to the second transfer gear diameter 138. In this way, torque can evenly be split 50/50 between the two torque flow paths 132, 134 when the first and second clutches 60, 62 and the first and second dog clutches 128, 130 are engaged.

To provide different forward gear ratios, the gears of the first gearset 64 and the gears of the second gearset 76 may be provided with different diameters. For example, the plurality of odd numbered gears 66 of the first gearset 64 may have gear diameters that increase with each higher numbered gear. Accordingly, the first gear 70 may have a first gear diameter 144, the third gear 72 may have a third gear diameter 146 that is larger than the first gear diameter 144, and the fifth gear 74 may have a fifth gear diameter 148 that is larger than the third gear diameter 146. Similarly, the plurality of even numbered gears 78 of the second gearset 76 may also have gear diameters that increase with each higher numbered gear. For example, the second gear 80 may have a second gear diameter 150, the fourth gear 82 may have a fourth gear diameter 152 that is larger than the second gear diameter 150, and the sixth gear 84 may have a sixth gear diameter 154 that is larger than the fourth gear diameter 152. The reverse gear 68 has a reverse gear diameter 156. The seventh gear 86 has a seventh gear diameter 158 that may be smaller than the fourth gear diameter 152 and the sixth gear diameter 154.

It should be appreciated that the first gear diameter 144 may or may not be equal to the second gear diameter 150, the third gear diameter 146 may or may not be equal to the fourth gear diameter 152, and the fifth gear diameter 148 may or may not be equal to the sixth gear diameter 154. Where the first gear diameter 144 is equal to the second gear diameter 150, the third gear diameter 146 is equal to the fourth gear diameter 152, and the fifth gear diameter 148 is equal to the sixth gear diameter 154, different forward gear ratios between these gears may still be achieved by using the first and second dog clutches 128, 130 to select different transfer gears 120, 122, 124, 126. For example, the first dog clutch 128 may engage only the first transfer gear 120 (meshed with the second transmission input gear 32) and the second dog clutch 130 may engage only the third transfer gear 124 when the first gear 70 is selected. In addition, the first dog clutch 128 may only engage the second transfer gear 122 and the second dog clutch 130 may engage only the fourth transfer gear 126 (meshed with the first transmission input gear 30) when the second gear 80 is selected to provide different forward gear ratios even where the first gear diameter 144 and the second gear diameter 150 are the same. In another configuration, the first gear diameter 144 and the second transfer gear diameter 138 and the second gear diameter 150 and the third transfer gear diameter 140 may be selected so that the first and second clutches 60, 62 may be closed during vehicle launch without binding of the dual-clutch transmission assembly 20. Specifically, the ratio of the first gear diameter 144 and the second transfer gear diameter 138 may be selected to equal the ratio of the second gear diameter 150 and the third transfer gear diameter 140. In this way, the first and second intermediate shafts 88, 90 rotate at the same speed when the first and second gears 70, 80 are engaged during vehicle launch.

In a similar fashion, the gears of the third and fourth gearsets 92, 102 may be provided with different diameters so that the gears of the third gearset 92 can mesh with the gears of the first gearset 64 and so that the gears of the fourth gearset 102 can mesh with the gears of the second gearset 76. In keeping with the arrangement shown in FIG. 1, the gears of the third gearset 92 may decrease in diameter with each higher numbered gear. For example, the first output gear 94 may have a first output gear diameter 160 that is larger than the first gear diameter 144, the third output gear 96 may have a third output gear diameter 162 that is larger than the third gear diameter 146 and smaller than the first output gear diameter 160, and the fifth output gear 98 may have a fifth output gear diameter 164 that is smaller than the fifth gear diameter 148 and the third output gear diameter 162. Similarly, the gears of the fourth gearset 102 may decrease in diameter with each higher numbered gear. For example, the second output gear 104 may have a second output gear diameter 166 that is larger than the second gear diameter 150, the fourth output gear 106 may have a fourth output gear diameter 168 that is larger than the fourth gear diameter 152 and smaller than the second output gear diameter 166, and the sixth output gear 108 may have a sixth output gear diameter 170 that is smaller than the sixth gear diameter 154 and the fourth output gear diameter 168. The reverse output gear 100 may have a reverse output gear diameter 172 that is larger than the reverse gear diameter 156. The seventh output gear 110 may have a seventh output gear diameter 174 that is larger than the seventh gear diameter 158 and that is larger than the fourth output gear diameter 168 and the sixth output gear diameter 170. As a result, a total of seven different forward gear ratios and a single reverse gear ratio are provided by the arrangement shown in FIG. 1.

Figure 2:
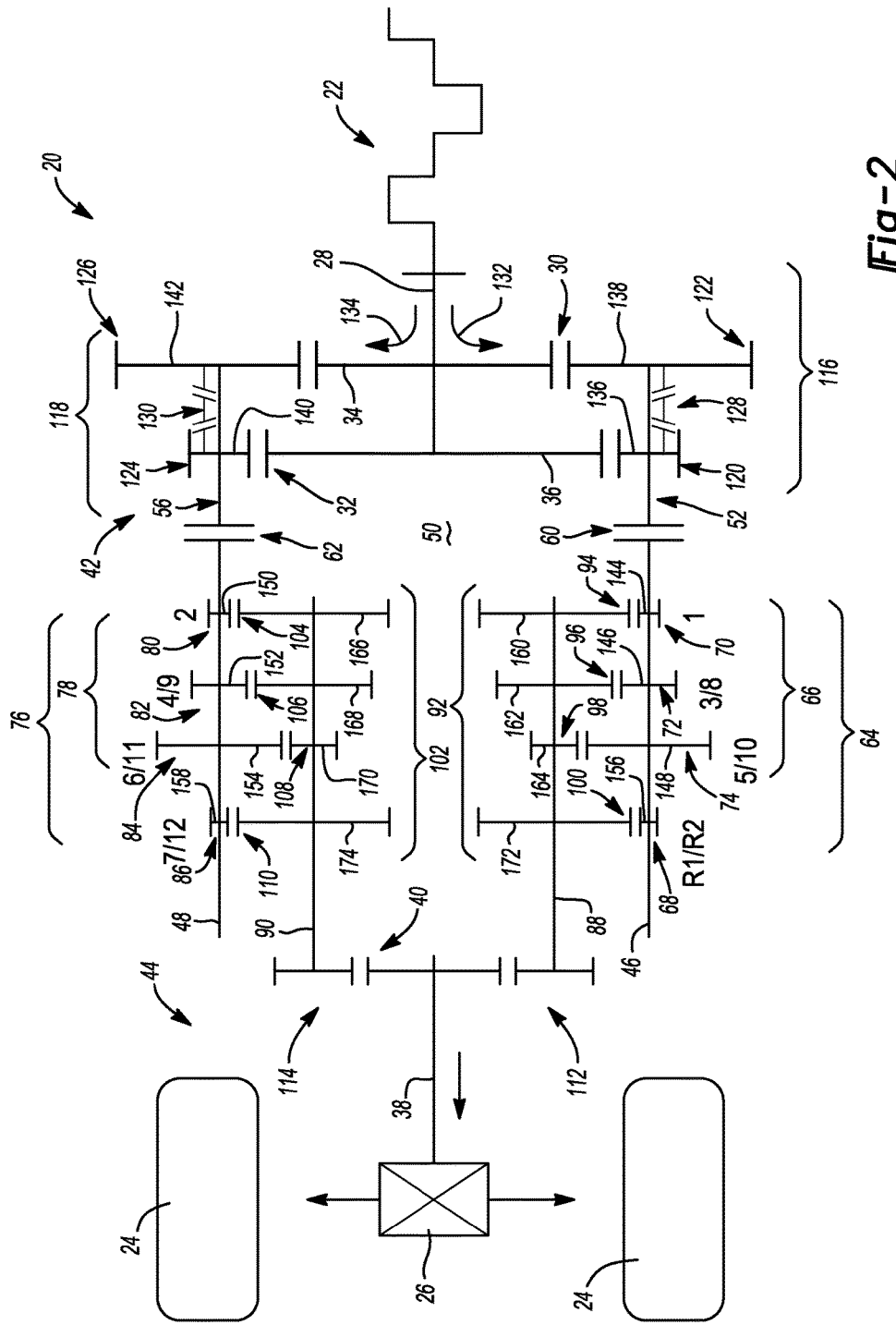
FIG. 2 is another schematic view of the exemplary torque split dual-clutch transmission assembly of FIG. 1 illustrating that systematic engagement of the two sets of transfer gears can provide additional gear ratios using existing gears that are carried on first and second layshafts.

With reference now to FIG. 2, the first and second transfer gears 120, 122 can be selectively and independently engaged by the first dog clutch 128 to provide two different gear ratios for at least some of the gears of the first gearset 64 and where the third and fourth transfer gears 124, 126 can be selectively and independently engaged by the second dog clutch 130 to provide two different gear ratios for at least some of the gears of the second gearset 76. In the exemplary configuration illustrated in FIG. 2, the first and second transfer gears 120, 122 are selectively and independently engaged by the first dog clutch 128 to provide two different gear ratios for each of the third gear 72, the fifth gear 74, and the reverse gear 68 of the first gearset 64. Accordingly, engagement of the first transfer gear 120 and the third gear 72 provides a third gear ratio and engagement of the second transfer gear 122 and the third gear 72 provides an eighth gear ratio. Engagement of the first transfer gear 120 and the fifth gear 74 provides a fifth gear ratio and engagement of the second transfer gear 122 and the fifth gear 74 provides a tenth gear ratio. Finally, engagement of the first transfer gear 120 and the reverse gear 68 provides a first reverse gear ratio and engagement of the second transfer gear 122 and the reverse gear 68 provides a second reverse gear ratio. While other arrangements are possible and within the scope of this disclosure, only a single ratio is provided for the first gear 70 in the arrangement shown in FIG. 2. However, it should be appreciated that in other arrangements the first gear 70 may optionally provide two different ratios.

Similarly, the third and fourth transfer gears 124, 126 are selectively and independently engaged by the second dog clutch 130 to provide two different gear ratios for each of the fourth gear 82, the sixth gear 84, and the seventh gear 86. Accordingly, engagement of the third transfer gear 124 and the fourth gear 82 provides a fourth gear ratio and engagement of the fourth transfer gear 126 and the fourth gear 82 provides a ninth gear ratio. Engagement of the third transfer gear 124 and the sixth gear 84 provides a sixth gear ratio and engagement of the fourth transfer gear 126 and the sixth gear 84 provides an eleventh gear ratio. Finally, engagement of the third transfer gear 124 and the seventh gear 86 provides a seventh gear ratio and engagement of the fourth transfer gear 126 and the seventh gear 86 provides a twelfth gear ratio. Again, although other arrangements are possible and within the scope of this disclosure, only a single ratio is provided for the second gear 80 in the arrangement shown in FIG. 2. However, it should be appreciated that in other arrangements the second gear 80 may optionally provide two different ratios as well.

As a result, twelve different forward gear ratios and two different reverse gear ratios are provided in FIG. 2, all without requiring the added weight, friction losses, and complexity that would otherwise be required by adding additional gears to the first and second gearsets 64, 76 to provide additional ratios. Thus, the disclosed torque split dual-clutch transmission assembly 20 also provides an unconventional and advantageous way of increasing the number of gear ratios in dual-clutch transmissions without adding more gears to the first and second gearsets 64, 76. Also, it should be appreciated that for the high numerically numbered gears, power-off shifts between one of the odd numbered gears 66 and another one of the odd numbered gears 66 and between one of the even numbered gears 78 and another one of the even numbered gears 78 may be accomplished.

Figure 3:
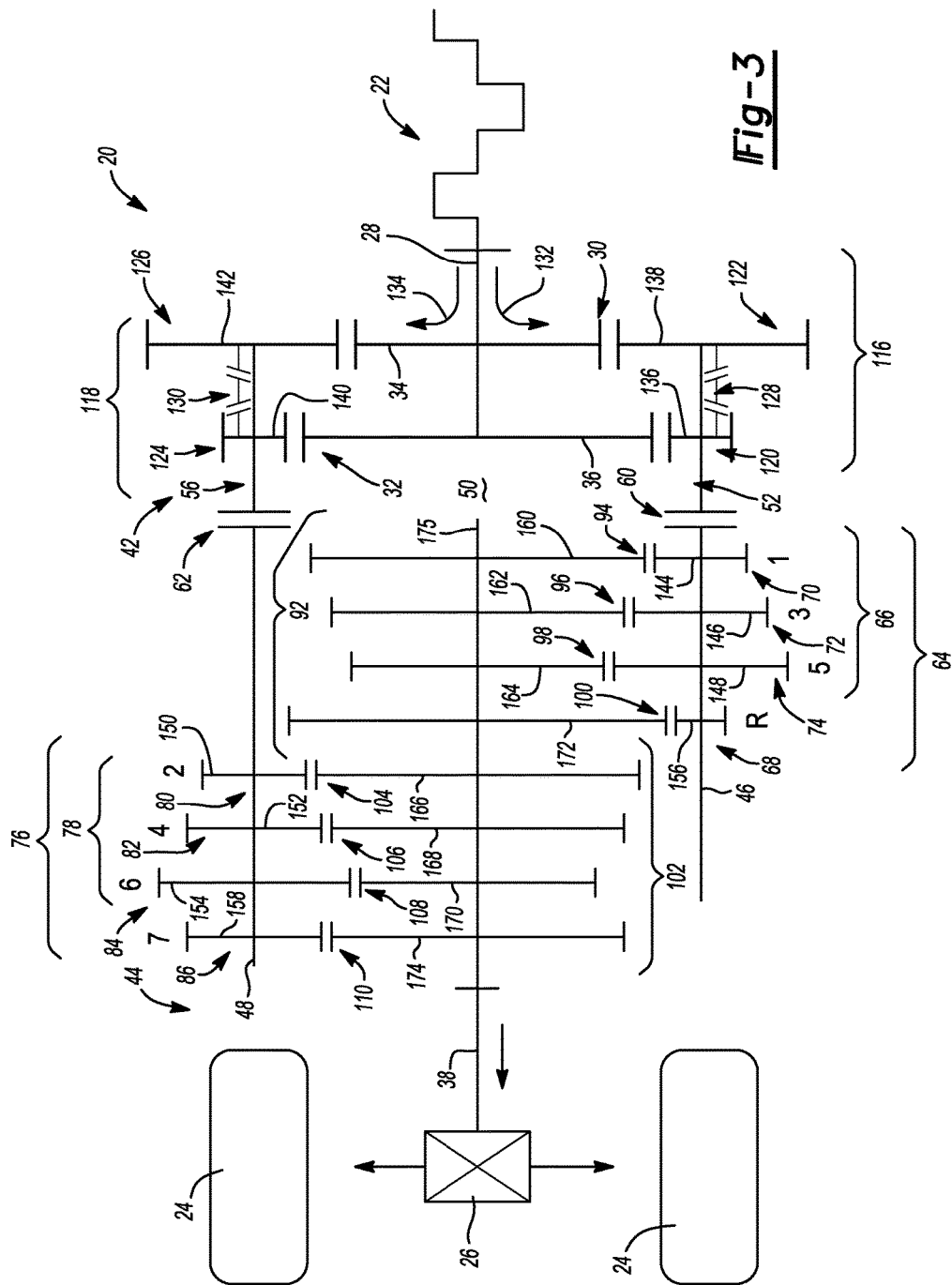
FIG. 3 is a schematic view of another exemplary torque split dual-clutch transmission assembly constructed in accordance with the subject disclosure where third and fourth gearsets are arranged next to one another in discrete groups on a single intermediate shaft.
Figure 4:
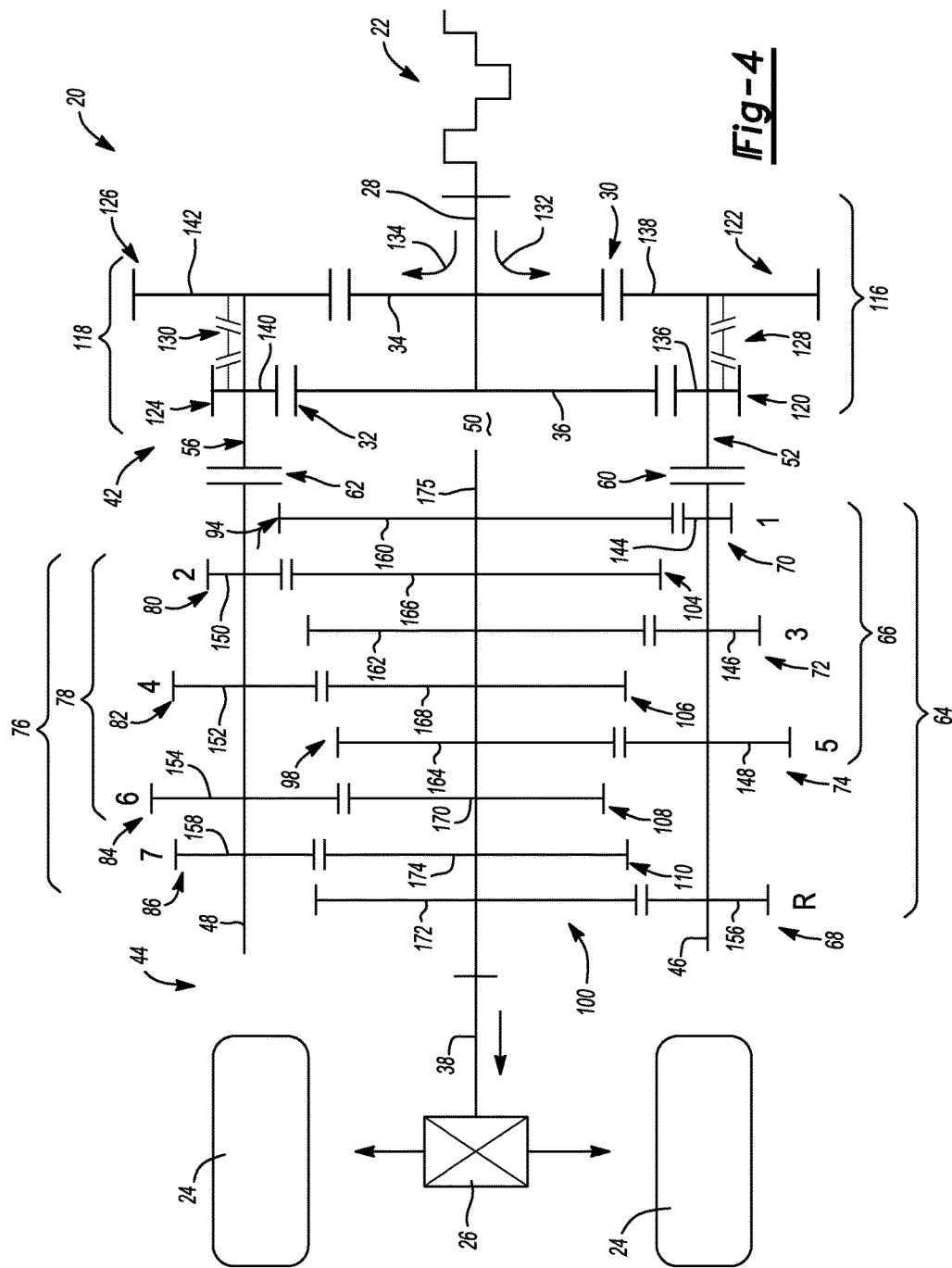
FIG. 4 is a schematic view of another exemplary torque split dual-clutch transmission assembly constructed in accordance with the subject disclosure where gears of the third and fourth gearsets are sequentially arranged along the single intermediate shaft.

In FIGS. 3 and 4, alternative configurations of the torque split dual-clutch transmission assembly 20 are illustrated where the first and second intermediate shafts 88, 90 of the configuration shown in FIGS. 1 and 2 have been replaced by a single intermediate shaft 175. Accordingly, the transmission output gear 40, the first intermediate shaft output gear 112, and the second intermediate shaft output gear 114 of the configuration shown in FIGS. 1 and 2 may also be eliminated. Instead, the single intermediate shaft 175 may be directly coupled to the transmission output shaft 38. In accordance with the configuration shown in FIGS. 3 and 4, both the third and fourth gearsets 92, 102 are rotatably coupled to and carried on the single intermediate shaft 175. In FIG. 3, the third gearset 92 is disposed on the single intermediate shaft 175 adjacent the fourth gearset 102 such that the first output gear 94, the third output gear 96, the fifth output gear 98, and the reverse output gear 100 are disposed to one side of the single intermediate shaft 175 while the second output gear 104, the fourth output gear 106, the sixth output gear 108, and the seventh output gear 110 are disposed to the other side of the single intermediate shaft 175. Alternatively, in FIG. 4, the gears of the third and fourth gearsets 92, 102 are disposed along in the single intermediate shaft 175 in sequential order where the gears are arranged in the following exemplary order along the single intermediate shaft 175: the first output gear 94, the second output gear 104, the third output gear 96, the fourth output gear 106, the fifth output gear 98, the sixth output gear 108, the seventh output gear 110, and the reverse output gear 100. In both FIGS. 3 and 4, the single intermediate shaft 175 is disposed adjacent to the first and second layshafts 46, 48. More particularly, the single intermediate shaft 175 may be positioned between the first and second layshafts 46, 48 and may be arranged parallel to the first and second layshafts 46, 48 such that the gears of the first and second gearsets 64, 76 are aligned in meshing engagement with the gears of the third and fourth gearsets 92, 102.

Figure 5:
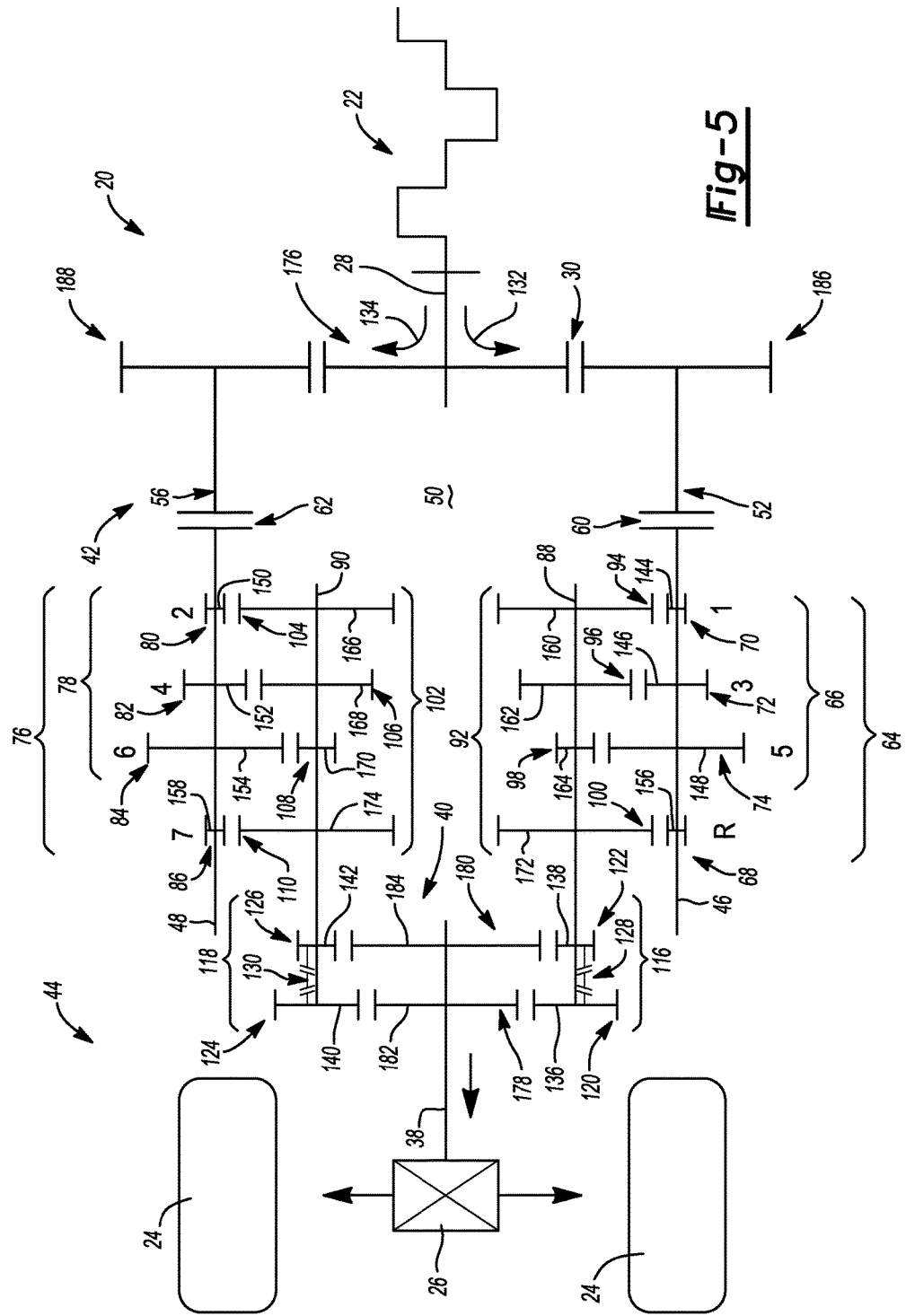
FIG. 5 is a schematic view of another exemplary torque split dual-clutch transmission assembly constructed in accordance with the subject disclosure where the two sets of transfer gears are carried on first and second intermediate shafts.

With reference to FIG. 5, another alternative configuration of the torque split dual-clutch transmission assembly 20 is illustrated. In this configuration, the at least two sets of transfer gears 116, 118 are selectively coupled to and carried on the first and second intermediate shafts 88, 90 rather than the first and second input hubs 52, 56. The torque split dual-clutch transmission assembly 20 of FIG. 5 still includes a transmission input shaft 28 that receives torque from the engine 22 of the vehicle. A single transmission input gear 176 is rotatably coupled to and carried on the transmission input shaft 28 in this configuration. By way of example and without limitation, the single transmission input gear 176 may be fixed to the transmission input shaft 28 by a splined, bolted, or welded connection or may be integral with the transmission input shaft 28. The torque split dual-clutch transmission assembly 20 of FIG. 5 also includes the transmission output shaft 38, which supplies torque to the wheels 24 of the vehicle through drivetrain components 26. In this configuration, the torque split dual-clutch transmission assembly 20 has two transmission output gears 178, 180 that are rotatably coupled to and carried on the transmission output shaft 38 including a first transmission output gear 178 and a second transmission output gear 180. By way of example and without limitation, the first and second transmission output gears 178, 180 may be fixed to the transmission output shaft 38 by a splined, bolted, or welded connection or may be integral with the transmission output shaft 38. The second transmission output gear 180 is disposed adjacent the first transmission output gear 178 and the first transmission output gear 178 is positioned between the second transmission output gear 180 and the drivetrain components 26. The two transmission output gears 178, 180 may be provided with different diameters where the first transmission output gear 178 has a first transmission output gear diameter 182 and the second transmission output gear 180 has a second transmission output gear diameter 184 that is larger than the first transmission output gear diameter 182.

As with the configurations shown in FIGS. 1 and 2, the torque split dual-clutch transmission assembly 20 of FIG. 5 includes a first layshaft 46 and a second layshaft 48. The first layshaft 46 extends parallel to and is transversely spaced from the transmission input shaft 28. The first layshaft 46 is aligned with a first input hub 52 that is disposed adjacent the transmission input shaft 28. The second layshaft 48 extends parallel to and is transversely spaced from the transmission input shaft 28 and the second layshaft 48. The second layshaft 48 is aligned with a second input hub 56 that is also disposed adjacent the transmission input shaft 28. A first clutch 60 is disposed between and interconnects the first input hub 52 and the first layshaft 46. Accordingly, the first clutch 60 selectively couples rotation of the first input hub 52 with rotation of the first layshaft 46. A second clutch 62 is disposed between and interconnects the second input hub 56 and the second layshaft 48. Accordingly. The second clutch 62 selectively couples rotation of the second input hub 56 with rotation of the second layshaft 48.

A first gearset 64 is rotatably connected to and carried on the first layshaft 46 and includes a plurality of odd numbered gears 66 and a reverse gear 68. In the exemplary configuration shown in FIG. 5, the plurality of odd numbered gears 66 of the first gearset 64 includes a first gear 70, a third gear 72, and a fifth gear 74. A second gearset 76 is rotatably connected to and carried on the second layshaft 48 and includes a plurality of even numbered gears 78 and a seventh gear 86. In the exemplary configuration shown, the plurality of even numbered gears 78 includes a second gear 80, a fourth gear 82, and a sixth gear 84. A first layshaft input gear 186 is rotatably coupled to and carried on the first input hub 52 and is arranged in meshing engagement with the transmission input gear 176. Accordingly, the first layshaft input gear 186 transfers rotational energy and torque from the transmission input gear 176 to the first input hub 52 and thus the first layshaft 46 when the first clutch 60 is engaged during operation of the of the torque split dual-clutch transmission assembly 20 shown in FIG. 5. Similarly, a second layshaft input gear 188 is rotatably coupled to and carried on the second input hub 56 and is arranged in meshing engagement with the transmission input gear 176 opposite the first layshaft input gear 186. Accordingly, the second layshaft input gear 188 transfers rotational energy and torque from the transmission input gear 176 to the second input hub 56 and thus the second layshaft 48 when the second clutch 62 is engaged during operation of the of the torque split dual-clutch transmission assembly 20 shown in FIG. 5.

A first intermediate shaft 88 extends parallel to and is transversely spaced from the first layshaft 46. Further, the first intermediate shaft 88 is positioned between the first layshaft 46 and the second layshaft 48 at a location that is adjacent the first layshaft 46. A second intermediate shaft 90 extends parallel to and is transversely spaced from the second layshaft 48. The second intermediate shaft 90 is also positioned between the first layshaft 46 and the second layshaft 48, but at a location that is adjacent the second layshaft 48.

A third gearset 92 is rotatably connected to and carried on the first intermediate shaft 88. The third gearset 92 is arranged in meshing engagement with the plurality of odd numbered gears 66 and the reverse gear 68 of the first gearset 64. In the configuration shown in FIG. 5, the third gearset 92 includes: a first output gear 94 arranged in meshing engagement with the first gear 70 of the first gearset 64, a third output gear 96 arranged in meshing engagement with the third gear 72 of the first gearset 64, a fifth output gear 98 arranged in meshing engagement with the fifth gear 74 of the first gearset 64, and a reverse output gear 100 arranged in meshing engagement with the reverse gear 68 of the first gearset 64. Accordingly, the first and third gearsets 64, 92 transfer rotational energy and torque from the first layshaft 46 to the first intermediate shaft 88 during operation of the of the torque split dual-clutch transmission assembly 20 shown in FIG. 5.

A fourth gearset 102 is rotatably connected to and carried on the second intermediate shaft 90. The fourth gearset 102 is arranged in meshing engagement with the plurality of even numbered gears 78 and the seventh gear 86 of the second gearset 76. As shown in FIG. 5, the fourth gearset 102 includes: a second output gear 104 arranged in meshing engagement with the second gear 80 of the second gearset 76, a fourth output gear 106 arranged in meshing engagement with the fourth gear 82 of the second gearset 76, a sixth output gear 108 arranged in meshing engagement with the sixth gear 84 of the second gearset 76, and a seventh output gear 110 arranged in meshing engagement with the seventh gear 86 of the second gearset 76. Accordingly, the second and fourth gearsets 76, 102 transfer rotational energy and torque from the second layshaft 48 to the second intermediate shaft 90 during operation of the of the torque split dual-clutch transmission assembly 20 shown in FIG. 5.

As explained in connection with the configurations shown in FIGS. 1 and 2, the plurality of odd numbered gears 66 of the first gearset 64 shown in FIG. 5 may have gear diameters that increase with each higher numbered gear and the plurality of even numbered gears 78 of the second gearset 76 shown in FIG. 5 may have gear diameters that increase with each high numbered gear. The gears of the third and fourth gearsets 92, 102 may thus have diameters that decrease with each high numbered output gear. Also, like in FIGS. 1 and 2, the gears of the first gearset 64, the second gearset 76, the third gearset 92, and the second gearset 102 may be selectively engaged to (by dog clutches, mechanical diodes, and the like) or fixed with (by splined, bolted, or welded connections and the like) the first and second layshafts 46, 48 and the first and second intermediate shafts 88, 90.

Each set of transfer gears 116, 118 may have equal gear ratios and each receives torque from the first and second intermediate shafts 88, 90 in response to contemporaneous engagement of the first clutch 60 and the second clutch 62 during launch of the vehicle to evenly split the torque applied to the first and second clutches 60, 62 and reduce heat generation in the first clutch 60 and/or in the second clutch 62. As shown in FIG. 5, the at least two sets of transfer gears 116, 118 include a first set of transfer gears 116 comprising a first transfer gear 120 and a second transfer gear 122 and a second set of transfer gears 118 comprising a third transfer gear 124 and a fourth transfer gear 126. The first transfer gear 120 is selectively coupled to and carried on the first intermediate shaft 88 and is arranged in meshing engagement with the first transmission output gear 178. Accordingly, the first transfer gear 120 transfers rotational energy and torque from the first intermediate shaft 88 to the first transmission output gear 178 and thus the transmission output shaft 38 when the first transfer gear 120 is engaged during operation of the of the torque split dual-clutch transmission assembly 20 shown in FIG. 5. The second transfer gear 122 is selectively coupled to and carried on the first intermediate shaft 88 and is disposed between the first transfer gear 120 and the reverse output gear 100. The second transfer gear 122 is arranged in meshing engagement with the second transmission output gear 180 such that the second transfer gear 122 transfers rotational energy and torque from the first intermediate shaft 88 to the second transmission output gear 180 and thus the transmission output shaft 38 when the second transfer gear 122 is engaged during operation of the of the torque split dual-clutch transmission assembly 20. The third transfer gear 124 is selectively coupled to and carried on the second intermediate shaft 90 and is arranged in meshing engagement with the first transmission output gear 178 opposite the first transfer gear 120. Accordingly, the third transfer gear 124 transfers rotational energy and torque from the second intermediate shaft 90 to the first transmission output gear 178 and thus the transmission output shaft 38 when the third transfer gear 124 is engaged during operation of the of the torque split dual-clutch transmission assembly 20 shown in FIG. 5. The fourth transfer gear 126 is selectively coupled to and carried on the second intermediate shaft 90 and is disposed between the third transfer gear 124 and the seventh output gear 110. The fourth transfer gear 126 is arranged in meshing engagement with the second transmission output gear 180 opposite the second transfer gear 122 such that the fourth transfer gear 126 transfers rotational energy and torque from the second intermediate shaft 90 to the second transmission output gear 180 and thus the transmission output shaft 38 when the fourth transfer gear 126 is engaged during operation of the of the torque split dual-clutch transmission assembly 20.

Selectable engagement of the first transfer gear 120, the second transfer gear 122, the third transfer gear 124, and the fourth transfer gear 126 is provided by a first dog clutch 128 and a second dog clutch 130. The first transfer gear 120 and the second transfer gear 122 may be disposed in a free-running configuration on the first intermediate shaft 88 and the third transfer gear 124 and the fourth transfer gear 126 may be disposed in a free-running configuration on the second intermediate shaft 90. By way of example and without limitation, bearing assemblies may be provided between the first intermediate shaft 88 and the first and second transfer gears 120, 122 and the second intermediate shaft 90 and the third and fourth transfer gears 124, 126. The first dog clutch 128 is disposed adjacent the first intermediate shaft 88 between the first transfer gear 120 and the second transfer gear 122 and selectively locks rotation of at least one of the first transfer gear 120 and the second transfer gear 122 with rotation of the first intermediate shaft 88. The second dog clutch 130 is disposed adjacent the second intermediate shaft 90 between the third transfer gear 124 and the fourth transfer gear 126 and selectively locks rotation of at least one of the third transfer gear 124 and the fourth transfer gear 126 with rotation of the second intermediate shaft 90. During vehicle launch, the first and second clutches 60, 62 and the first and second dog clutches 128, 130 are engaged such that the torque applied to the transmission input shaft 28 is split into two torque flow paths 132, 134 that pass through the first and second layshafts 46, 48 respectively. The two torque flow paths 132, 134 pass from the first and second layshafts 46, 48 to the first and second intermediate shafts 88, 90 and are then re-combined at the transmission output shaft 38 through the two sets of transfer gears 116, 118 and the first and second transmission output gears 178, 180. In this way, each of the first and second clutches 60, 62 experience only a portion of the torque that is applied to the transmission input shaft 28, therefore reducing heat generation in the first clutch 60 and/or the second clutch 62.

The first and second transfer gears 120, 122 of the first set of transfer gears 116 may have different diameters and the third and fourth transfer gears 124, 126 of the second set of transfer gears 118 may have different diameters. For example, the first transfer gear 120 may have a first transfer gear diameter 136 and the second transfer gear 122 may have a second transfer gear diameter 138 that is larger than the first transfer gear diameter 136. The third transfer gear 124 may have a third transfer gear diameter 140 and the fourth transfer gear 126 may have a fourth transfer gear diameter 142 that is larger than the second transfer gear diameter 138. In this way, the difference in diameter between the first and second transfer gears 120, 122 and between the third and fourth transfer gears 124, 126 may correspond to the difference in diameter between the first transmission output gear 178 and the second transmission output gear 180. Preferably, the first set of transfer gears 116 and the second set of transfer gears 118 may also have equal gear ratios. For example, the third transfer gear diameter 140 may be equal to the first transfer gear diameter 136 and the fourth transfer gear diameter 142 may be equal to the second transfer gear diameter 138. In this way, torque can evenly be split 50/50 between the two torque flow paths 132, 134 when the first and second clutches 60, 62 and the first and second dog clutches 128, 130 are engaged.

In yet another variation of the torque split dual-clutch transmission assembly 20 shown in FIGS. 1-5, the second transfer gear 122 of the first set of transfer gears 116 and the fourth transfer gear 126 of the second set of transfer gears 118 may be eliminated by providing the first transfer gear 120 and the third transfer gear 124 with different diameters. Because the second and fourth transfer gears 122, 126 are eliminated in this configuration, the first and second dog clutches 128, 130 can also be eliminated. Instead, the first and third transfer gears 120, 124 may be rotatably coupled to the first and second input hubs 52, 56, respectively, by a splined connection, fasteners, welding, or similar structural connections. At least one transmission input gear 32 is rotatably coupled to and carried on the transmission input shaft 28. Like in the other configurations shown in FIGS. 1-5, the first clutch 60 is disposed between and interconnects the first input hub 52 and the first layshaft 46. Engagement of the first clutch 60 selectively couples rotation of the first input hub 52 with rotation of the first layshaft 46. The second clutch 62 is disposed between and interconnects the second input hub 56 and the second layshaft 48. Engagement of the second clutch 62 selectively couples rotation of the second input hub 56 with rotation of the second layshaft 48.

The first gearset 64 is rotatably coupled to and carried on the first layshaft 46 and the second gearset 76 is rotatably coupled to and carried on the second layshaft 48. The first gearset 64 transfers torque between the first layshaft 46 and the transmission output shaft 38. Although the first gearset 64 may include a number of different gears, the first gearset 64 includes at least the first gear 70. The second gearset 76 transfers torque between the second layshaft 48 and the transmission output shaft 38. Although the second gearset 76 may include a number of different gears, the second gearset 76 includes at least the second gear 80. As described above, the second gear diameter 150 is different than the first gear diameter 144. By way of example and without limitation, the second gear diameter 150 may be larger than the first gear diameter 144. In accordance with this configuration, the first transfer gear 120 and the third transfer gear 124 also have different diameters. By way of example and without limitation, the first transfer gear diameter 136 may be smaller than the third transfer gear diameter 140. The first and third transfer gears 120, 124 are arranged in meshing engagement with the at least one transmission input gear 32 such that each of the first transfer gear 120 and the third transfer gear 124 each receives torque from the transmission input shaft 28. It should be appreciated that the torque applied to the first and third transfer gears 120, 124 is split between the first and second clutches 60, 62 in response to engagement of the second clutch 62 while the first clutch 60 is also engaged. It should also be appreciated that because the first and second gears 70, 80 have different diameters, the first and second gears 70, 80 define a ratio of the first gear diameter 144 to the second gear diameter 150. The ratio of the first gear diameter 144 to the second gear diameter 150 equals a ratio between the different diameters of the first and third transfer gears 120, 124 (i.e. the ratio of the first transfer gear diameter 136 to the third transfer gear diameter 140). Because these ratios are equal to one another, torque can be transferred through both the first gear 70 and the second gear 80 when the first and second clutches 60, 62 are engaged without the first gear 70 and the second gear 80 binding.

Figure 6:
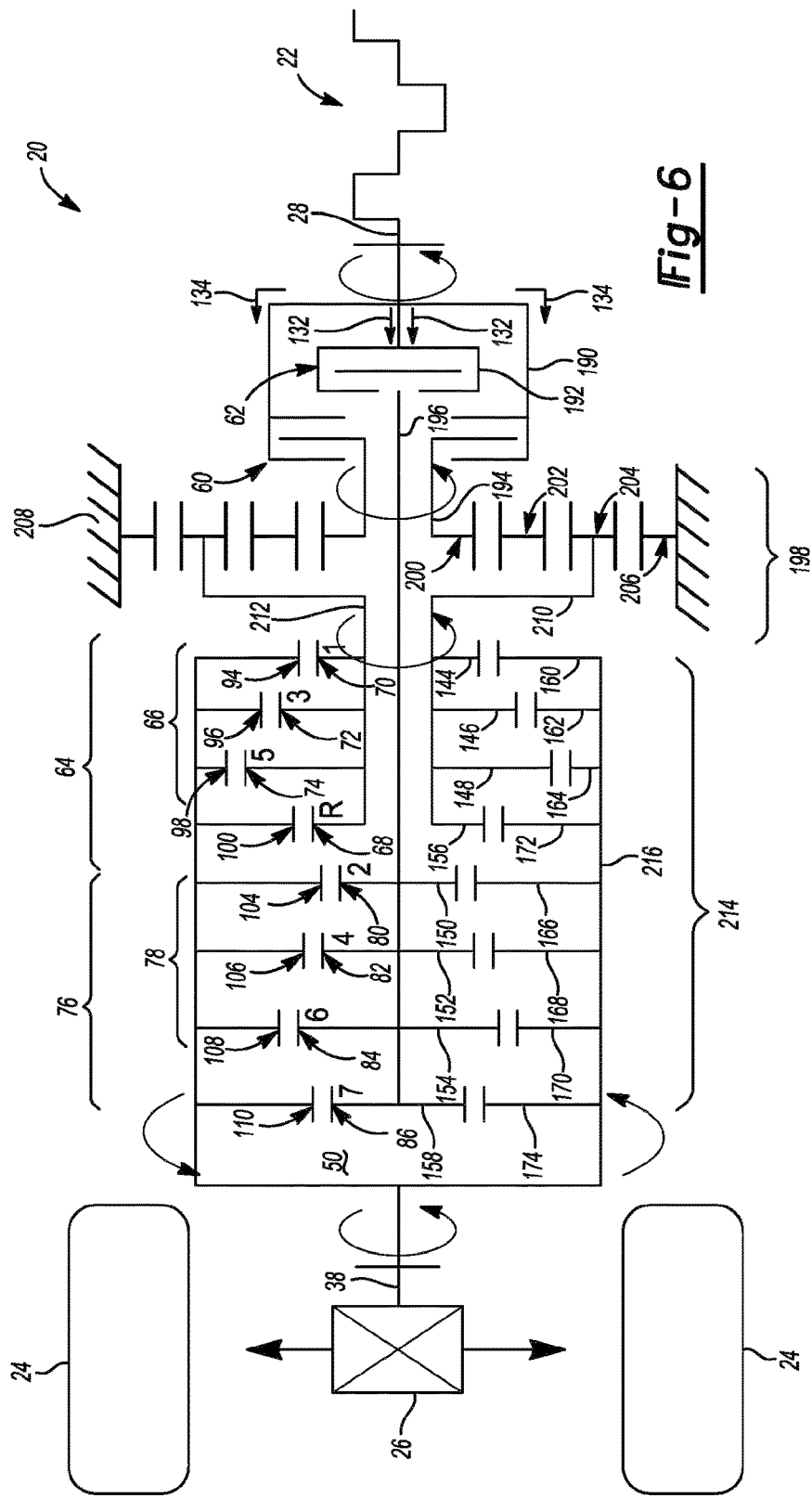
FIG. 6 is a schematic view of another exemplary torque split dual-clutch transmission assembly constructed in accordance with the subject disclosure where the torque split dual-clutch transmission assembly has a planetary configuration with two sets of pinion gears.
Figure 7:
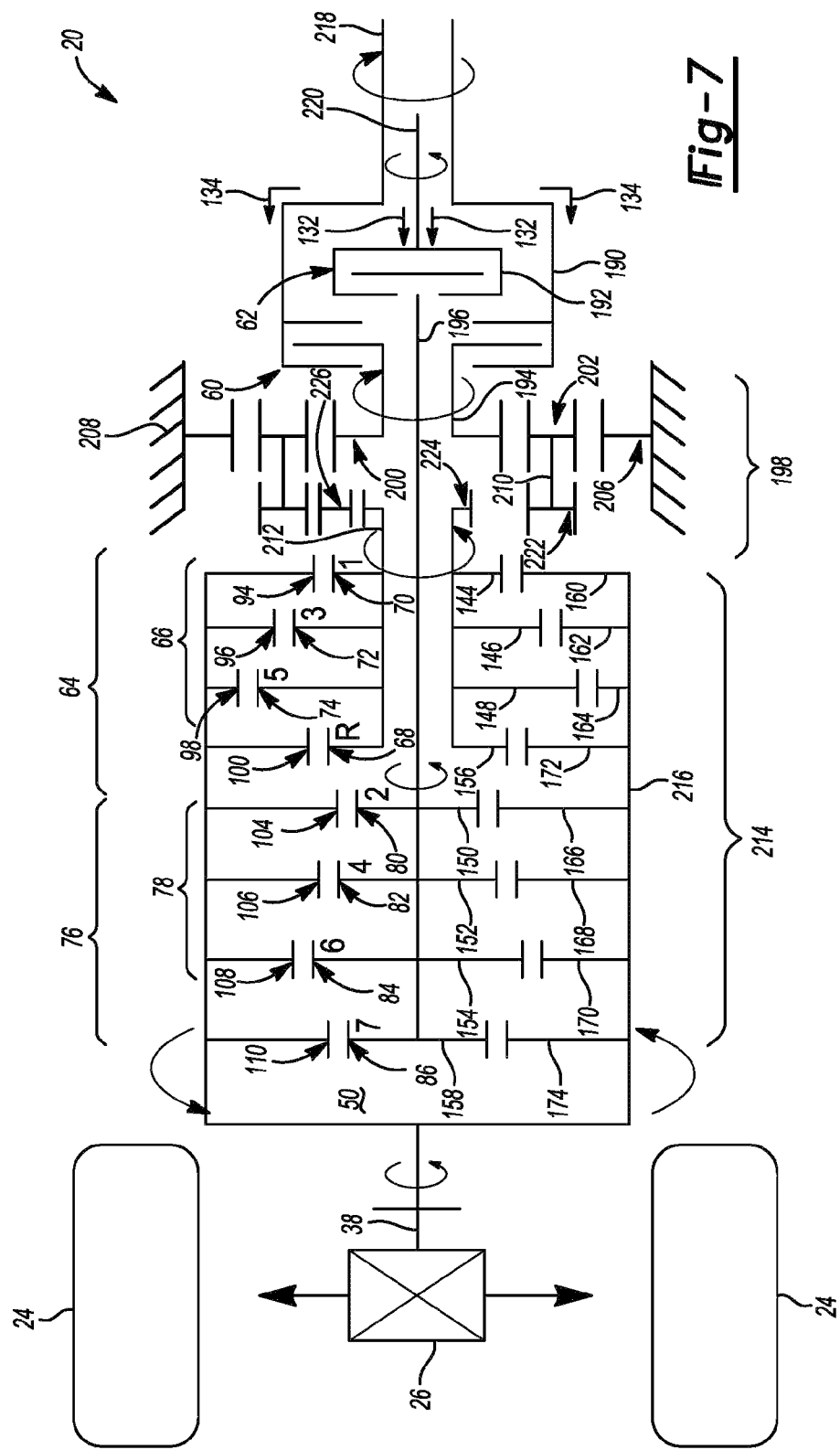
FIG. 7 is a schematic view of another exemplary torque split dual-clutch transmission assembly constructed in accordance with the subject disclosure where the torque split dual-clutch transmission assembly has a planetary configuration with one set of pinion gears and a reverse idler.

FIGS. 6 and 7 illustrate a planetary configuration of the disclosed torque split dual-clutch transmission assembly 20. Referring to FIG. 6, the torque split dual-clutch transmission assembly 20 includes at least one transmission input shaft 28 and a transmission output shaft 38 that are spaced from one another by a longitudinal gap 50. Again, the at least one transmission input shaft 28 may be rotatably coupled to an engine 22 and the transmission output shaft 38 may be rotatably coupled to drivetrain components 26 that transfer torque to the wheels 24 of the vehicle. A first input member 190 is rotatably coupled to the at least one transmission input shaft 28. Although the first input member 190 may have a variety of different shapes, the first input member 190 may have the shape of a drum for example. A second input member 192 is disposed co-axially within the first input member 190. The second input member 192 may also be rotatably coupled to the at least one transmission input shaft 28. The torque split dual-clutch transmission assembly 20 also includes a first shaft 194 that is aligned with the first input member 190. The first shaft 194 is also hollow and receives a second shaft 196 that is disposed co-axially within the first shaft 194. A first clutch 60 is disposed between and interconnects the first input member 190 and the first shaft 194. When engaged, the first clutch 60 couples rotation of the first input member 190 with the first shaft 194. A second clutch 62 is disposed between and interconnects the second input member 192 and the second shaft 196. When engaged, the second clutch 62 couples rotation of the second input member 192 with the second shaft 196.

The torque split dual-clutch transmission assembly 20 further includes a third shaft 212 that is hollow and that extends co-axially about the second shaft 196 at a location that is axially spaced from the first shaft 194. A planetary gearset 198 is disposed between and interconnects the first shaft 194 and the third shaft 212. The planetary gearset 198 includes a sun gear 200, one or more pinion gears 202, 204, and a ring gear 206. The sun gear 200 is rotatably coupled to and is carried on the first shaft 194 and the ring gear 206 is fixed to a ground 208. By way of example and without limitation, the sun gear 200 may be fixed to the first shaft 194 by a splined, bolted, or welded connection or may be integral with the first shaft 194. By way of example and without limitation, the ground 208 may be a housing of the torque split dual-clutch transmission assembly 20.

Still referring to FIG. 6, the pinion gears 202, 204 may be grouped into a first set of pinion gears 202 and a second set of pinion gears 204. The first set of pinion gears 202 are disposed in meshing engagement with the sun gear 200. The second set of pinion gears 204 are disposed in meshing engagement with the first set of pinion gears 202. The ring gear 206 is then disposed in meshing engagement with the second set of pinion gears 204. A carrier 210 is disposed between and rotatably couples the second set of pinion gears 204 and the third shaft 212. Therefore, rotation of the carrier 210 drives the third shaft 212.

First gearset 64 is rotatably coupled to and is carried on the third shaft 212 and second gearset 76 is rotatably coupled to and is carried on the second shaft 196. The axial arrangement of the first gearset 64 and the second gearset 76 is such that the first gearset 64 is disposed axially between the second gearset 76 and the planetary gearset 198. The first gearset 64 includes a plurality of odd numbered gears 66 and a reverse gear 68. In the exemplary configuration shown in FIG. 6, the plurality of odd numbered gears 66 of the first gearset 64 includes a first gear 70, a third gear 72, and a fifth gear 74. The second gearset 76 includes a plurality of even numbered gears 78 and a seventh gear 86. In the exemplary configuration shown, the plurality of even numbered gears 78 includes a second gear 80, a fourth gear 82, and a sixth gear 84. In FIG. 6, the gears of the first gearset 64 may be selectively engaged to (by dog clutches, mechanical diodes, and the like) or fixed with (by splined, bolted, or welded connections and the like) the third shaft 212 and the gears of the second gearset 76 may be selectively engaged to (by dog clutches, mechanical diodes, and the like) or fixed with (by splined, bolted, or welded connections and the like) the second shaft 196.

An output member 216 extends co-axially about the first gearset 64 and the second gearset 76. Although the output member 216 may have a variety of different shapes, the output member 216 may have the shape of a drum for example. The output member 216 is rotatably coupled to the transmission output shaft 38 such that rotation of the output member 216 drives the transmission output shaft 38. An output gearset 214 is rotatably coupled to and is carried on the output member 216. The gears of the output gearset 214 may be selectively engaged to (by dog clutches, mechanical diodes, and the like) or fixed with (by splined, bolted, or welded connections and the like) the output member 216. The output gearset 214 is also arranged in meshing engagement with the first gearset 64 and the second gearset 76. The output gearset 214 includes: a first output gear 94 arranged in meshing engagement with the first gear 70 of the first gearset 64, a second output gear 104 arranged in meshing engagement with the second gear 80 of the second gearset 76, a third output gear 96 arranged in meshing engagement with the third gear 72 of the first gearset 64, a fourth output gear 106 arranged in meshing engagement with the fourth gear 82 of the second gearset 76, a fifth output gear 98 arranged in meshing engagement with the fifth gear 74 of the first gearset 64, a sixth output gear 108 arranged in meshing engagement with the sixth gear 84 of the second gearset 76, a seventh output gear 110 arranged in meshing engagement with the seventh gear 86 of the second gearset 76, and a reverse output gear 100 arranged in meshing engagement with the reverse gear 68 of the first gearset 64. Accordingly, the first and second gearsets 64, 76 transfer rotational energy and torque from the third shaft 212 and the second shaft 196, respectively, to the output gearset 214 and thus the output member 216 during operation of the of the torque split dual-clutch transmission assembly 20 shown in FIG. 6.

As explained in connection with the configurations shown in FIGS. 1 and 2, the gears of the first gearset 64 have diameters 144, 146, 148, 156 and the gears of the second gearset 76 have diameters 150, 152, 154, 158. Similarly, the gears of the output gearset 214 have diameters 160, 162, 164, 166, 168, 170, 172, 174. The plurality of odd numbered gears 66 of the first gearset 64 shown in FIG. 6 may have gear diameters 144, 146, 148 that increase with each higher numbered gear and the plurality of even numbered gears 78 of the second gearset 76 shown in FIG. 6 may have gear diameters 150, 152, 154 that increase with each high numbered gear. The gears of the output gearset 214 may thus have diameters 160, 162, 164, 166, 168, 170 that decrease with each high numbered output gear.

It should be appreciated that during operation of the torque split dual-clutch transmission assembly 20 shown in FIG. 6, the at least one transmission input shaft 28, the first shaft 194, the second shaft 196, the third shaft 212, the output member 216, and the transmission output shaft 38 all rotate in the same direction. The first gearset 64 and the second gearset 76 receive torque from the third shaft 212 and the second shaft 196, respectively, in response to contemporaneous engagement of the first clutch 60 and the second clutch 62 during launch of the vehicle. Advantageously, this splits the torque that is applied to the first and second clutches 60, 62 and reduces heat generation in the first clutch 60 and in the second clutch 62.

FIG. 7 illustrates an alternative configuration of the torque split dual-clutch transmission assembly 20 shown in FIG. 6 where there are first and second transmission input shafts 218, 220 instead of just one. The first transmission input shaft 218 is rotatably coupled to the first input member 190 and the second transmission input shaft 220 is rotatably coupled to the second input member 192. The first transmission input shaft 218 may be hollow and thus the second transmission input shaft 220 may be co-axially arranged within the first transmission input shaft 218. It should be appreciated that it this configuration, the first transmission input shaft 218 and the second transmission input shaft 220 are capable of rotating in opposite directions. When the first and second clutches 60, 62 are both engaged, the first shaft 194 rotates with the first transmission input shaft 218 and the second shaft 196 rotates with the second transmission input shaft 220, which may be rotating in a direction that is opposite the first shaft 194 and the first transmission input shaft 218.

The first gearset 64, the second gearset 76, the output gearset 214, and the arrangement of the first and second clutches 60, 62, the first, second, and third shafts 194, 196, 212, and the output member 216 of the configuration shown in FIG. 6 are all carried over to the configuration shown in FIG. 7. However, the planetary gearset 198 must be modified to accommodate the opposite rotating directions of the first transmission input shaft 218 and the second transmission input shaft 220.

In this configuration, the ring gear 206 of the planetary gearset 198 is disposed in meshing engagement with the first set of pinion gears 202 and the second set of pinion gears 204 are eliminated. The planetary gearset 198 further includes at least one auxiliary pinion gear 222 that is rotatably coupled to the first set of pinion gears 202 by the carrier 210. The planetary gearset 198 also includes an auxiliary sun gear 224 that is rotatably coupled to the third shaft 212. By way of example and without limitation, the auxiliary sun gear 224 may be fixed to the third shaft 212 by a splined, bolted, or welded connection or may be integral with the third shaft 212. A reverse idler 226 is disposed in meshing engagement with both the auxiliary pinion gear 222 and the auxiliary sun gear 224. The reverse idler 226 operates to reverse rotation of the auxiliary sun gear 224 and thus the third shaft 212 relative to the carrier 210. Accordingly, the second shaft 196, the third shaft 212, and the output member 216 all rotate in the same direction when the first shaft 194 and the second shaft 196 are rotating in opposite directions. Because rotation of the third shaft 212 is reversed from rotation of the first shaft 194, the first and second gearsets 64, 76 do not bind with the output gearset 214 when the first and second clutches 60, 62 are simultaneously engaged. This configuration of the planetary gearset 198 thus allows torque to be split between the first and second clutches 60, 62 when the torque split dual-clutch transmission assembly 20 includes two transmission input shafts 218, 220 rotating in opposite directions.

A method of controlling the dual-clutch transmission assembly 20 described above is also disclosed. Advantageously, the method splits the torque produced by the engine 22 between the first and second clutches 60, 62 during vehicle launch to prevent the first and second clutches 60, 62 from overheating. The method comprising the steps of: applying torque to the transmission input shaft 28 of the dual-clutch transmission assembly 20 to rotate the transmission input shaft 28, transferring the torque applied to the transmission input shaft 28 to the first input hub 52 of the dual-clutch transmission assembly 20 and through the first torque flow path 132 in order to rotate the first input hub 52 at a first rotational speed, and transferring the torque applied to the transmission input shaft 28 to the second input hub 56 of the dual-clutch transmission assembly 20 and through the second torque flow path 134 in order to rotate the second input hub 56 at a second rotational speed. The second rotational speed is different than the first rotational speed. For example and without limitation, the first rotational speed of the first input hub 52 may be faster than the second rotational speed of the second input hub 56. It should also be appreciated that in the example shown in FIG. 1, the step of transferring the torque applied to the transmission input shaft 28 to the first input hub 52 may be performed by engagement of the second transmission input gear 32 and the first transfer gear 120 and the step of transferring the torque applied to the transmission input shaft 28 to the second input hub 56 may be performed by engagement of the first transmission input gear 30 and the fourth transfer gear 126. Because the first transfer gear diameter 136 is smaller than the fourth transfer gear diameter 142, the first rotational speed of the first input hub 52 will be faster than the second rotational speed of the second input hub 56.

The method further comprises the step of engaging the first clutch 60, which is disposed between the first input hub 52 and the first layshaft 46 of the dual-clutch transmission assembly 20, in order to transfer torque from the first input hub 52 to the first layshaft 46. Therefore, the first layshaft 46 rotates at the first rotational speed in response to the engagement of the first clutch 60. Similarly, the method includes the step of engaging the second clutch 62, which is disposed between the second input hub 56 and the second layshaft 48 of the dual-clutch transmission assembly 20, while the first clutch 60 is also engaged, in order to transfer torque from the second input hub 46 to the second layshaft 48. Therefore, the second layshaft 48 rotates at the second rotational speed in response to the engagement of the second clutch 62. The method also includes the step of transferring the torque applied to the first and second layshafts 46, 48 to the transmission output shaft 38 of the dual-clutch transmission assembly 20 through two gears of different diameters that are rotatably coupled to and carried on the first and second layshafts 46, 48 respectively. It should be appreciated that in the example shown in FIG. 1, the step of transferring the torque applied to the first and second layshafts 46, 48 to the transmission output shaft 38 of the dual-clutch transmission assembly 20 through two gears of different diameters may be performed by engagement of the first gear 70 with the first output gear 94 and engagement of the second gear 80 with the second output gear 104. Torque from the first and second intermediate shafts 88, 90 is then transferred to the transmission output shaft 38 through the transmission output gear 40 and the first and second intermediate shaft output gears 112, 114.

In addition to the steps described above, the method further includes the step of selecting the different diameters of the two gears that are rotatably coupled to and carried on the first and second layshafts 46, 48 such that the different diameters of the two gears allow the first layshaft 46 to rotate at the first rotational speed and the second layshaft 48 to rotate at the second rotational speed without binding when both of the two gears are engaged and transfer torque to the transmission output shaft 38. It should be appreciated that in the example shown in FIG. 1, this step may be performed by selecting the first gear diameter 144 of the first gear 70 and the second gear diameter 150 of the second gear 80 such that the first and second intermediate shafts 88, 90 rotate at the same rotational speed even though the first gear 70 and the second gear 80 are rotating at different rotational speeds. By appropriately selecting the first and second gear diameters 144, 150, the first gear 70 and the second gear 80 can both transfer torque to the transmission output shaft 38 without binding.

It should also be appreciated that the method described above may be modified where the first input hub 52 is driven at the same rotational speed as the second input hub 56. In other words, the first rotational speed of the first input hub 52 may equal the second rotational speed of the second input hub 56. As such, the method may include the step of selecting the two gears that are rotatably coupled to and carried on the first and second layshafts 46, 48 to have equal diameters so as to allow the first layshaft 46 to rotate at the same rotational speed as the second layshaft 48 without binding when both of the two gears are engaged and transfer torque to the transmission output shaft 38. In the example shown in FIG. 1, this step may be performed by engaging the first and third transfer gears 120, 124 with the second transmission input gear 32. The first and third transfer gears 120, 124 may be selected where the first transfer gear diameter 136 equals the third transfer gear diameter 140 such that the first and second input hubs 52, 56 are driven at the same rotational speed. Similarly, the first and second gears 70, 80 may be selected such that the first gear diameter 144 equals the second gear diameter 150 such that the first and second intermediate shafts 88, 90 also rotate at the same rotational speed.

Many modifications and variations of the present invention are possible in light of the above teachings and may be practiced otherwise than as specifically described while within the scope of the appended claims. These antecedent recitations should be interpreted to cover any combination in which the inventive novelty exercises its utility. It should be appreciated that any of the various gears may be selectively or fixedly coupled to the shaft they are carried on, providing a variety of different combinations where the various gears can be selectively engaged and disengaged as needed to control operation of the dual-clutch transmission assembly 20 and effectuate shifts. All such variations are considered to be within the scope of the subject disclosure. It should also be appreciated that although the torque split dual-clutch transmission assembly 20 recited in the claims may be coupled to an engine 22 when the torque split dual-clutch transmission assembly 20 is installed in a vehicle, the presence or absence of the engine 22 and the vehicle is not intended to be required under the appended claims.

What is claimed is:

1. A torque split dual-clutch transmission assembly that splits torque generated by an engine of a vehicle, the dual-clutch transmission assembly comprising:
    a transmission input shaft that receives torque from the engine of the vehicle;
    a transmission output shaft that supplies torque to drivetrain components of the vehicle;
    a first layshaft;
    a first input hub disposed adjacent said first layshaft;
    a second layshaft spaced from said first layshaft;
    a second input hub disposed adjacent said second layshaft;
    a first clutch disposed between and interconnecting said first input hub and said first layshaft, said first clutch selectively coupling rotation of said first input hub with rotation of said first layshaft;
    a second clutch disposed between and interconnecting said second input hub and said second layshaft, said second clutch selectively coupling rotation of said second input hub with rotation of said second layshaft;
    a first gearset rotatably coupled to and carried on said first layshaft that transfers torque between said first layshaft and said transmission output shaft;
    a second gearset rotatably coupled to and carried on said second layshaft that transfers torque between said second layshaft and said transmission output shaft; and
    at least two sets of transfer gears selectively coupled to and carried on said first and second input hubs respectively, each set of transfer gears receiving torque from said transmission input shaft in response to contemporaneous engagement of said first clutch and said second clutch to split the torque applied to said first and second clutches.

2. The torque split dual-clutch transmission assembly as set forth in claim 1 further comprising:
    a first transmission input gear rotatably coupled to and carried on said transmission input shaft; and
    a second transmission input gear rotatably coupled to and carried on said transmission input shaft wherein said first transmission input gear is disposed between said second transmission input gear and the engine of the vehicle.

3. The torque split dual-clutch transmission assembly as set forth in claim 2 wherein said first transmission input gear has a first transmission input gear diameter and said second transmission input gear has a second transmission input gear diameter that is larger than said first transmission input gear diameter.

4. The torque split dual-clutch transmission assembly as set forth in claim 2 wherein said at least two sets of transfer gears include a first set of transfer gears comprising a first transfer gear and a second transfer gear and a second set of transfer gears comprising a third transfer gear and a fourth transfer gear.

5. The torque split dual-clutch transmission assembly as set forth in claim 4 wherein said first transfer gear and said third transfer gear are arranged in meshing engagement with said second transmission input gear and said second transfer gear and said fourth transfer gear are arranged in meshing engagement with said first transmission input gear.

6. The torque split dual-clutch transmission assembly as set forth in claim 4 wherein said first transfer gear is disposed between said second transfer gear and said first clutch and said third transfer gear is disposed between said fourth transfer gear and said second clutch.

7. The torque split dual-clutch transmission assembly as set forth in claim 4 further comprising:
    a first dog clutch disposed adjacent said first input hub, said first transfer gear, and said second transfer gear that selectively locks rotation of at least one of said first transfer gear and said second transfer gear with rotation of said first input hub; and
    a second dog clutch disposed adjacent said second input hub, said third transfer gear, and said fourth transfer gear that selectively locks rotation of at least one of said third transfer gear and said fourth transfer gear with rotation of said second input hub.

8. The torque split dual-clutch transmission assembly as set forth in claim 7 wherein said first and second transfer gears are selectively and independently engaged in rotation with said first input hub by said first dog clutch and said third and fourth transfer gears are selectively and independently engaged in rotation with said second input hub by said second dog clutch to provide two different gear ratios for at least some gears in said first and second gearsets.

9. The torque split dual-clutch transmission assembly as set forth in claim 4 wherein said first set of transfer gears and said second set of transfer gears have equal gear ratios.

10. The torque split dual-clutch transmission assembly as set forth in claim 1 wherein said first gearset includes a plurality of odd numbered gears and said second gearset includes a plurality of even numbered gears, said plurality of odd numbered gears having gear diameters that increase with each higher numbered gear and said plurality of even numbered gears having gear diameters that increase with each higher numbered gear.

11. The torque split dual-clutch transmission assembly as set forth in claim 1 further comprising:
    a first intermediate shaft extending parallel to and transversely spaced from said first layshaft, said first intermediate shaft being disposed adjacent said first layshaft and positioned between said first layshaft and said second layshaft; and
    a third gearset rotatably coupled to and carried on said first intermediate shaft that is arranged in meshing engagement with said first gearset.

12. The torque split dual-clutch transmission assembly as set forth in claim 11 further comprising:
    a second intermediate shaft extending parallel to and transversely spaced from said second layshaft, said second intermediate shaft being disposed adjacent said second layshaft and positioned between said first layshaft and said second layshaft; and
    a fourth gearset rotatably coupled to and carried on said second intermediate shaft that is arranged in meshing engagement with said second gearset.

13. The torque split dual-clutch transmission assembly as set forth in claim 12 further comprising:

a transmission output gear rotatably coupled to and carried on said transmission output shaft;
a first intermediate shaft output gear rotatably coupled to and carried on said first intermediate shaft that is arranged in meshing engagement with said transmission output gear; and
a second intermediate shaft output gear rotatably coupled to and carried on said second intermediate shaft that is arranged in meshing engagement with said transmission output gear opposite said first intermediate shaft output gear.

14. The torque split dual-clutch transmission assembly as set forth in claim 1 further comprising:
a single intermediate shaft extending parallel to and transversely spaced from said first and second layshafts, said single intermediate shaft being rotatably coupled to said transmission output shaft;
a third gearset rotatably coupled to and carried on said single intermediate shaft that is arranged in meshing engagement with said first gearset; and
a fourth gearset rotatably coupled to and carried on said single intermediate shaft that is arranged in meshing engagement with said second gearset.

15. A torque split dual-clutch transmission assembly comprising:
a transmission input shaft;
a transmission output shaft;
a first layshaft;
a first input hub disposed adjacent said first layshaft;
a second layshaft spaced from said first layshaft;
a second input hub disposed adjacent said second layshaft;
a first clutch disposed between and interconnecting said first input hub and said first layshaft, said first clutch selectively coupling rotation of said first input hub with said first layshaft;
a second clutch disposed between and interconnecting said second input hub and said second layshaft, said second clutch selectively coupling rotation of said second input hub with said second layshaft;
a first gearset rotatably coupled to and carried on said first layshaft;
a second gearset rotatably coupled to and carried on said second layshaft;
a first intermediate shaft adjacent said first layshaft;
a second intermediate shaft adjacent said second layshaft;
a third gearset rotatably coupled to and carried on said first intermediate shaft that is arranged in meshing engagement with said first gearset;
a fourth gearset rotatably coupled to and carried on said second intermediate shaft that is arranged in meshing engagement with said second gearset; and
at least two sets of transfer gears selectively coupled to and carried on said first and second intermediate shafts respectively, each set of transfer gears receiving torque from said first and second intermediate shafts in response to contemporaneous engagement of said first clutch and said second clutch to split the torque applied to said first and second clutches.

16. The torque split dual-clutch transmission assembly as set forth in claim 15 further comprising:
a first transmission output gear rotatably coupled to and carried on said transmission output shaft; and
a second transmission output gear rotatably coupled to and carried on said transmission output shaft, said second transmission output gear being disposed adjacent said first transmission output gear.

17. The torque split dual-clutch transmission assembly as set forth in claim 16 wherein said first transmission output gear has a first transmission output gear diameter and said second transmission output gear has a second transmission output gear diameter that is larger than said first transmission output gear diameter.

18. The torque split dual-clutch transmission assembly as set forth in claim 16 wherein said at least two sets of transfer gears include a first set of transfer gears comprising a first transfer gear and a second transfer gear and a second set of transfer gears comprising a third transfer gear and a fourth transfer gear.

19. The torque split dual-clutch transmission assembly as set forth in claim 18 wherein said first transfer gear and said third transfer are arranged in meshing engagement with said first transmission output gear and said second transfer gear and said fourth transfer gear are arranged in meshing engagement with said second transmission output gear.

20. The torque split dual-clutch transmission assembly as set forth in claim 19 wherein said second transfer gear is disposed between said first transfer gear and said third gearset and said fourth transfer gear is disposed between said third transfer gear and said fourth gearset.

21. The torque split dual-clutch transmission assembly as set forth in claim 19 further comprising:
a first dog clutch disposed adjacent said first intermediate shaft, said first transfer gear, and said second transfer gear that selectively locks rotation of at least one of said first transfer gear and said second transfer gear with rotation of said first intermediate shaft; and
a second dog clutch disposed adjacent said second intermediate shaft, said third transfer gear, and said fourth transfer gear that selectively locks rotation of at least one of said third transfer gear and said fourth transfer gear with rotation of said second intermediate shaft.

22. The torque split dual-clutch transmission assembly as set forth in claim 19 wherein said first set of transfer gears and said second set of transfer gears have equal gear ratios.

23. The torque split dual-clutch transmission assembly as set forth in claim 15 wherein said first gearset includes a plurality of odd numbered gears and said second gearset includes a plurality of even numbered gears, said plurality of odd numbered gears having gear diameters that increase with each higher numbered gear and said plurality of even numbered gears having gear diameters that increase with each higher numbered gear.

24. The torque split dual-clutch transmission assembly as set forth in claim 15 further comprising:
a transmission input gear rotatably coupled to and carried on said transmission input shaft.

25. The torque split dual-clutch transmission assembly as set forth in claim 24 further comprising:
a first layshaft input gear rotatably coupled to and carried on said first input hub that is arranged in meshing engagement with said transmission input gear; and
a second layshaft input gear rotatably coupled to and carried on said second input hub that is arranged in meshing engagement with said transmission input gear opposite said first layshaft input gear.

26. A torque split dual-clutch transmission assembly comprising:
at least one transmission input shaft;
a transmission output shaft;
a first input member rotatably coupled to said at least one transmission input shaft;
a second input member disposed co-axially within said first input member;

a first shaft that is hollow and aligned with said first input member;

a second shaft disposed co-axially within said first shaft;

a first clutch disposed between and interconnecting said first input member and said first shaft, said first clutch selectively coupling said first input member and said first shaft to transfer torque from said first input member to said first shaft;

a second clutch disposed between and interconnecting said second input member and said second shaft, said second clutch selectively coupling said second input member with said second shaft to transfer torque from said second input member to said second shaft;

a third shaft that is hollow and that extends co-axially about said second shaft at a location that is axially spaced from said first shaft;

a planetary gearset disposed between and interconnecting said first shaft and said third shaft, a first gearset rotatably coupled to and carried on said third shaft;

a second gearset rotatably coupled to and carried on said second shaft;

an output member extending co-axially about said first gearset and said second gearset that is rotatably coupled to said transmission output shaft; and an output gearset rotatably coupled to and carried on said output member that is arranged in meshing engagement with said first gearset and said second gearset;

wherein said first gearset and said second gearset receive torque from said third and second shafts respectively in response to contemporaneous engagement of said first clutch and said second clutch to split the torque applied to said first and second clutches.

27. The torque split dual-clutch transmission assembly as set forth in claim 26 wherein said second input member is rotatably coupled to said at least one transmission input shaft.

28. The torque split dual-clutch transmission assembly as set forth in claim 26 wherein said planetary gearset includes a sun gear, at least one pinion gear, and a ring gear, said sun gear being rotatably coupled to and carried on said first shaft, said at least one pinion gear including a first set of pinion gears disposed in meshing engagement with said sun gear, and said ring gear being fixed to a ground.

29. The torque split dual-clutch transmission assembly as set forth in claim 28 wherein said at least one pinion gear includes a second set of pinion gears disposed in meshing engagement with said first set of pinion gears, said ring gear being disposed in meshing engagement with said second set of pinion gears.

30. The torque split dual-clutch transmission assembly as set forth in claim 29 further comprising:

a carrier disposed between and rotatably coupling said second set of pinion gears and said third shaft.

31. The torque split dual-clutch transmission assembly as set forth in claim 28 wherein said at least one transmission input shaft includes a first transmission input shaft and a second transmission input shaft, said first transmission input shaft being rotatably coupled to said first input member and said second transmission input shaft being rotatably coupled to said second input member.

32. The torque split dual-clutch transmission assembly as set forth in claim 31 wherein said planetary gearset includes a reverse idler that allows said first transmission input shaft and said second transmission input shaft to rotate in opposite directions.

33. The torque split dual-clutch transmission assembly as set forth in claim 28 wherein said ring gear is disposed in meshing engagement with said first set of pinion gears.

34. The torque split dual-clutch transmission assembly as set forth in claim 33 further comprising:

at least one auxiliary pinion gear rotatably coupled to said first set of pinion gears by a carrier;

an auxiliary sun gear rotatably coupled to said third shaft; and a reverse idler disposed in meshing engagement with both said auxiliary pinion gear and said auxiliary sun gear that reverses rotation of said carrier relative to said auxiliary sun gear such that said second shaft and said third shaft rotate in the same direction when said first shaft and said second shaft are rotating in opposite directions.

35. A torque split dual-clutch transmission assembly that splits torque generated by an engine of a vehicle, the dual-clutch transmission assembly comprising:

a transmission input shaft that receives torque from the engine of the vehicle;

at least one transmission input gear rotatably coupled to and carried on said transmission input shaft;

a transmission output shaft that supplies torque to drivetrain components of the vehicle;

a first layshaft;

a first input hub disposed adjacent said first layshaft;

a second layshaft spaced from said first layshaft;

a second input hub disposed adjacent said second layshaft;

a first clutch disposed between and interconnecting said first input hub and said first layshaft, said first clutch selectively coupling rotation of said first input hub with rotation of said first layshaft;

a second clutch disposed between and interconnecting said second input hub and said second layshaft, said second clutch selectively coupling rotation of said second input hub with rotation of said second layshaft;

a first gearset rotatably coupled to and carried on said first layshaft that transfers torque between said first layshaft and said transmission output shaft, said first gearset including at least a first gear having a first gear diameter;

a second gearset rotatably coupled to and carried on said second layshaft that transfers torque between said second layshaft and said transmission output shaft, said second gearset including at least a second gear having a second gear diameter that is different than said first gear diameter; and said first input hub and said second input hub each having at least one transfer gear, said transfer gears being rotatably coupled to and carried on said first and second input hubs respectively, said transfer gears having different diameters, and said transfer gears being arranged in meshing engagement with said at least one transmission input gear such that each transfer gear receives torque from said transmission input shaft and such that the torque applied to said transfer gears is split between said first and second clutches in response to engagement of said second clutch while said first clutch is also engaged, wherein a ratio of said first gear diameter to said second gear diameter equals a ratio between said different diameters of said transfer gears, thereby allowing torque to be transferred through said first gear and through said second gear when both of said first and second clutches are engaged without said first gear and said second gear binding.

36. The torque split dual-clutch transmission assembly as set forth in claim 35 further comprising:
- a first intermediate shaft extending parallel to and transversely spaced from said first layshaft, said first intermediate shaft being disposed adjacent said first layshaft and positioned between said first layshaft and said second layshaft; and
- a third gearset rotatably coupled to and carried on said first intermediate shaft that is arranged in meshing engagement with said first gearset.

37. The torque split dual-clutch transmission assembly as set forth in claim 36 further comprising:
- a second intermediate shaft extending parallel to and transversely spaced from said second layshaft, said second intermediate shaft being disposed adjacent said second layshaft and positioned between said first layshaft and said second layshaft; and
- a fourth gearset rotatably coupled to and carried on said second intermediate shaft that is arranged in meshing engagement with said second gearset.

38. The torque split dual-clutch transmission assembly as set forth in claim 37 further comprising:
- a transmission output gear rotatably coupled to and carried on said transmission output shaft;
- a first intermediate shaft output gear rotatably coupled to and carried on said first intermediate shaft that is arranged in meshing engagement with said transmission output gear; and
- a second intermediate shaft output gear rotatably coupled to and carried on said second intermediate shaft that is arranged in meshing engagement with said transmission output gear opposite said first intermediate shaft output gear.

39. The torque split dual-clutch transmission assembly as set forth in claim 35 further comprising:
- a single intermediate shaft extending parallel to and transversely spaced from said first and second layshafts, said single intermediate shaft being rotatably coupled to said transmission output shaft;
- a third gearset rotatably coupled to and carried on said single intermediate shaft that is arranged in meshing engagement with said first gearset; and
- a fourth gearset rotatably coupled to and carried on said single intermediate shaft that is arranged in meshing engagement with said second gearset.

\* \* \* \* \*